(12) United States Patent
Draim

(10) Patent No.: US 6,714,521 B2
(45) Date of Patent: *Mar. 30, 2004

(54) SYSTEM AND METHOD FOR IMPLEMENTING A CONSTELLATION OF NON-GEOSTATIONARY SATELLITES THAT PROVIDES SIMPLIFIED SATELLITE TRACKING

(75) Inventor: John E. Draim, Vienna, VA (US)

(73) Assignee: Space Resources International Ltd., Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 325 days.

(21) Appl. No.: 09/750,047

(22) Filed: Dec. 29, 2000

(65) Prior Publication Data

US 2002/0132577 A1 Sep. 19, 2002

(51) Int. Cl.⁷ ................................................ H04B 7/185
(52) U.S. Cl. ........................ 370/316; 455/427; 455/431
(58) Field of Search .................................. 370/311, 316, 370/318, 319, 321, 323, 324, 325, 334; 455/3.02, 427, 430, 431, 12.1, 13.1, 13.4, 98, 429

(56) References Cited

U.S. PATENT DOCUMENTS

| | | | |
|---|---|---|---|
| 4,502,051 A | | 2/1985 | Dondl |
| 5,326,054 A | * | 7/1994 | Turner .......................... 342/352 |
| 5,582,367 A | * | 12/1996 | Castiel et al. ............... 455/12.1 |
| 5,619,525 A | * | 4/1997 | Wiedeman et al. .......... 370/316 |
| 5,691,980 A | * | 11/1997 | Welles, II et al. ........... 370/316 |
| 5,845,206 A | * | 12/1998 | Castiel et al. ............... 455/13.4 |
| 5,949,812 A | * | 9/1999 | Turney et al. ............... 370/311 |
| 5,957,409 A | * | 9/1999 | Castiel et al. ............... 455/12.1 |
| 6,102,335 A | * | 8/2000 | Castiel et al. ............... 455/430 |
| 6,263,188 B1 | * | 7/2001 | Castiel et al. ............... 455/13.1 |
| 6,333,718 B1 | * | 12/2001 | Poncel et al. ................ 343/753 |
| 6,333,924 B1 | * | 12/2001 | Porcelli et al. .............. 370/331 |
| 6,522,636 B1 | * | 2/2003 | Hogberg et al. ............ 370/316 |
| 2001/0012759 A1 | * | 8/2001 | Castiel et al. ............... 455/12.1 |
| 2001/0051521 A1 | * | 12/2001 | Castiel et al. ............... 455/429 |
| 2002/0077099 A1 | * | 6/2002 | LaPrade ..................... 455/12.1 |

FOREIGN PATENT DOCUMENTS

WO    WO 98/51022    11/1998

OTHER PUBLICATIONS

J. Nauck et al: The Loopus Concept and Its Applications; vol. 12, No. 3, May 1, 1998, pp. 191–196.
W. Milcz: Some Communication Aspects of Satellite Systems Using Highly Inclined Orbits; Space Communications; vol. 7, No. 4/6; Nov. 1, 1990; pp. 355–363.

* cited by examiner

*Primary Examiner*—Chi Pham
*Assistant Examiner*—Anh-Vu H Ly
(74) *Attorney, Agent, or Firm*—Rabin & Berdo, P.C.; Phillip G. Avruch

(57) ABSTRACT

Provided is a system and method for implementing a constellation of satellites in inclined elliptical orbits that provides simplified satellite tracking for ground stations on the earth. The satellite orbits form a pair of repeating ground tracks around the earth. In each ground track the satellites operate only in active arcs well above or below the equator, emulating many of the characteristics of geostationary satellites. The parameters of the satellite orbits are adjusted so that the end points of the active arcs in the two ground tracks coincide; the turn-off point of an active arc in one ground track being the same as the turn-on point of an active arc in the other. For a ground station served by the satellites in these arcs, the active satellites appear to be moving slowly in one direction around a closed, teardrop-shaped path in the sky, at a generally high elevation angle.

39 Claims, 16 Drawing Sheets

SYSTEM AND METHOD FOR IMPLEMENTING A CONSTELLATION OF NON-GEOSTATIONARY SATELLITES THAT PROVIDES SIMPLIFIED SATELLITE TRACKING

FIELD OF THE INVENTION

The present invention is generally related to satellite communications systems and, more particularly, to a constellation of non-geostationary satellites that can be deployed and utilized in a manner that materially increases global communications satellite capacity, does not interfere with the existing geostationary satellite ring, and provides simplified satellite tracking.

BACKGROUND OF THE INVENTION

Geostationary ("geo") satellites for telecommunications applications were first proposed many years ago by the author Arthur C. Clark. Today, there are numerous communications systems employing geo satellites for such diverse applications as telephone and data trunking, television distribution, direct-to-home broadcasting, and mobile communications. Geo satellites operate on the physical principle that a satellite, in circular orbit at the proper altitude above the equator, will orbit the earth at the same angular velocity as the earth's rotation. These satellites therefore, appear to be fixed relative to a point on the earth. This characteristic of geo satellites facilitates their use for communications applications by allowing communications terminals on the earth to simply point their antennas at essentially one position in the sky.

There are however, a number of distinct drawbacks associated with geostationary satellite systems. One major drawback is the high cost of raising a satellite into geo orbit. Geostationary orbits have a radius from the earth center of approximately 36,000 kilometers. Typically, a geo satellite is launched first into an elliptical transfer orbit having an apogee at geostationary altitude, and then its orbit is circularized by using a kick motor to impart the necessary additional momentum to the satellite at apogee. The apogee kick motor, before it is fired, typically weighs as much as the satellite itself, meaning that the launch vehicle must initially launch a payload twice as heavy as the satellite in final orbit. Accordingly, the cost of putting a satellite into the high circular orbit required for geostationary operation is significantly greater than for non-geostationary satellites. The cost associated with deployment of satellites must generally be amortized over the lifetime of the satellite, making use of geo satellites more expensive.

The high altitude of the geostationary orbit also adds to the size and weight of geo satellites. Path loss, the attenuation suffered by radio signals traveling in free space, is proportional to the square of the distance between the source and the receiver. This means that the antenna size and transmitted power of a geo satellite must be greater than those of a satellite in lower orbit in order to achieve the same communications link performance. This is particularly true in mobile and other direct-to-user applications where the size and power of the user terminal are constrained by practical considerations and the burden of providing acceptable link performance falls largely on the satellite. The generally larger size and weight of geo satellites adds further to the cost of launch as compared to satellites intended to operate in lower orbits.

Another problem associated with the altitude at which geo satellites orbit is the delay in the round trip transmission to and from the satellite. For a pair of diverse communications terminals located within the coverage area of a gee satellite, the path length from terminal-to-satellite-to terminal is at least 70,000 kilometers. For the average satellite "hop" the associated transmission delay is approximately one-quarter of a second. For voice communications by satellite, the delay is noticeable to some users, and may require the use special circuitry for echo control. For data communications, the delay complicates the use of protocols that are predicated on the characteristics of terrestrial circuits.

Other problems arise from the geometry of coverage of geo satellite systems. A geostationary satellite system intended to provide "global" services would include three geo satellites spaced equal along the equatorial arc at 120-degree intervals. The coverage area of each of these satellites describes a circle on the surface of the earth with its center on the equator. At the equator, the coverage areas of two adjacent geo satellites overlap approximately 40 degrees in longitude. However, the overlap decreases as latitude increases, and there are points on the earth, north and south of the coverage areas, from which none of the geo satellites is visible. For example, many points in Alaska, Canada and Scandinavia cannot even see the geo satellites, these satellites being below their visible horizon.

For a geo system, in which the satellites are in orbit above the equator, earth stations in the equatorial regions generally "see" the satellites at high elevation angles above the horizon. However, as the latitude of an earth station location increases, the elevation angle to geo satellites from the earth station decreases. For example, elevation angles from ground stations in the United States to geostationary satellites range from 20 to 50 degrees. Low elevation angles can degrade the satellite communications link in several ways. The significant increase in path length through the atmosphere at low elevation angles exacerbates such effects as rain fading, atmospheric absorption and scintillation. For mobile communications systems in particular, low elevation angles increase link degradation due to blockage and multipath effects.

Another, and perhaps more significant, problem resulting from the specific geometry of the geo orbit, is the limited availability of orbital positions (or "slots") along the geostationary orbital arc. The ring of geostationary satellites that has grown up over time generally occupies multiple slots spaced two degrees apart and identified by their longitudinal positions. This arrangement has been adopted internationally to allow for satellite communications with a minimum of interference between adjacent satellites operating in the same frequency bands. The two-degree spacing is achieved by using high gain, directional antennas at the ground stations accessing the satellites. The geo ring around the equator thus provides a total of 180 slots (360 degrees/two degrees per slot). Most of the geo slots are now occupied, making it difficult to find positions for more geo satellites. Frequency, polarization and beam diversity have been used to multiply capacity, but capacity in the geostationary arc remains limited. Moreover, not all geo orbital positions are equally useful or attractive for various applications.

Various non-geostationary satellite systems have been implemented in the past to overcome some of the drawbacks of geo satellites. An early example is the Russian Molniya system, which employed satellites in elliptical 12-hour orbits to provide coverage to the northern latitudes in the Soviet Union. The Iridium and Globalstar systems use satellites in low circular orbits to significantly reduce transmission delay and allow acceptable link performance with very small user terminals. However, non-geostationary systems operate in inclined orbits, and thus pose a potential for interference with geo satellites operating at the same frequencies as they cross the geostationary ring.

In January 1999, an application was filed before the Federal Communications Commission (FCC) by Virtual Geosatellite LLC for the construction of a global broadband satellite communications system based on the teachings of U.S. Pat. Nos. 5,845,206 and 5,957,409, issued on Dec. 21, 1998 and Sep. 28, 1999, respectively, to the inventor of the present invention and two other individuals. The system proposed in the FCC application employs three arrays of satellites in elliptical orbits, two arrays covering the northern hemisphere and one covering the southern hemisphere, each array having five 8-hour satellites emulating many of the characteristics of geo satellites. The satellites appear to "hang" in the sky because their angular velocity at or near apogee approximates the rotation rate of the earth. Nine so-called "active arcs" are created with centers located at the apogee points of the satellite orbits. The satellites in each of the three arrays move in a repeating ground track from one active arc to the next, so that there is always one active satellite available in each active arc. While in their active arcs, the satellites move very slowly, averaging only about eight degrees per hour, with respect to terrestrial antennas. Between arcs, the satellites are deactivated. The active arcs occupy a different portion of the sky than any of the geo satellites located near the equator. As a result, the virtual geo satellites are visible from most parts of the northern and southern hemispheres, but do not interfere with satellites in the geo arc.

Although the prior art virtual geo satellite constellation described above addresses many of the shortcomings of geostationary satellites, it requires that ground terminals track the satellites as they slowly traverse the active arcs. Moreover, as one satellite leaves the end of an active arc and is deactivated, the ground station antenna must quickly re-point, or slew, 40–50 degrees to pick up the satellite that has just arrived at the beginning of the active arc to take the place of the first satellite. For large antennas, such rapid slewing may prove impractical, and actually require the use of two antennas at each site. Phased array antennas can provide rapid re-pointing, but the commercial availability of affordable designs, especially for the consumer market, is unclear. Some form of data buffering to cover the outage period is another possible alternative, although also likely to be complex and expensive.

OBJECTIVES

Therefore, it is an objective of the present invention to provide a system of non-geostationary satellites that significantly simplifies the tracking requirements and reduces the cost for satellite ground stations.

It is another objective of the present invention to provide a system of satellites that materially increases global communications satellite capacity without interfering with the existing geostationary satellite ring.

It is a further objective of the present invention to provide a global system of communications satellites with higher average elevation angles and lower transmission delay than existing geostationary satellites.

It is yet a further objective of the present invention to provide a total global communications system of satellites and ground facilities with lower construction and implementation costs than existing geostationary systems.

The above-stated objectives, as well as other objectives, features and advantages, of the present invention will become readily apparent from the following detailed description, which is to be read in conjunction with the appended drawings.

SUMMARY OF THE INVENTION

The present invention is directed to a constellation of non-geostationary satellites that may be deployed and utilized in a manner that materially increases global communications capacity, does not interfere with satellites in the existing geostationary ring, and provides simplified satellite tracking. A system embodiment includes first and second pluralities of satellites in inclined elliptical orbits, each plurality of satellites forming a repeating ground track that brings the satellites over the same points on the earth everyday. In the preferred embodiment the satellites have a mean motion of 3, meaning they orbit the earth three times per day, but other integer values of mean motion, such as 2 and 4 are applicable.

Each orbiting satellite has communications equipment on board for communicating with ground stations. The communications equipment on each satellite in the constellation is enabled, or activated (e.g., powered) only during a portion of the orbit when the satellite is near apogee, the point in the orbit where the satellite altitude is greatest and the satellite is moving most slowly from the viewpoint of the earth stations. Preferably, the portion of the orbit during which the satellite is enabled is symmetrically disposed about the apogee of the orbit. In the preferred embodiment, with mean motion 3, each of the satellites is enabled near its apogee for a duration of 4 hours, which is 50 percent of its total orbit period.

Each of the satellite ground tracks has a number of active arcs corresponding to the portion of the satellite orbits during which the communications equipment on the satellites is enabled to communicate. The orbits of the first plurality of satellites are configured such that each of the active arcs of the first ground track begins and ends at points that fall on the same meridian of longitude. This is accomplished by selecting an argument of perigee that "leans" the satellite orbits toward the equator, placing the satellite apogee at about 40 degrees latitude. The "argument of perigee" is an orbital parameter that indicates the angular position in the plane of the orbit where perigee occurs. Arguments of perigee between zero degrees and 180 degrees locate the position of perigee in the Northern Hemisphere, and hence concentrate satellite coverage in the Southern Hemisphere. Conversely arguments of perigee between 180 degrees and 360 degrees locate the perigee in the Southern Hemisphere and hence concentrate coverage on the Northern Hemisphere.

At the same time, the orbits of the second plurality of satellites have an argument of perigee that is the supplementary angle of the argument of perigee of the first plurality of satellites, causing the satellite orbits of the second plurality of satellites to lean by an equal amount in the opposite direction. The orbits of the second plurality of satellites are further configured such that each active arc of the second ground track begins at a point coincident with the ending point of one of the active arcs of the first ground track, and ends at a point coincident with the beginning point of the same one of the first active arcs. The result, as viewed from a ground station, is a closed path formed by an active arc of the first ground track and a corresponding active arc of the second ground track. For the preferred embodiment with an orbital mean motion of three, the closed path is repeated three times around the earth, at equal, 120-degree intervals.

In addition to the constellation of satellites, the system embodiment of the present invention typically includes a plurality of ground stations, each having communications equipment configured to communicate with the communications equipment on the first and second plurality of satellites, and located at positions on the earth from which they can track satellites in one of the first active arcs and satellites in the one second active arc that has coincident beginning and ending points.

In another aspect of the invention, the orbits of the first and second pluralities of satellites are configured such that at all times there is at least one satellite in either each of the active arcs of the first ground track, or each of the active arcs of the second ground track. Preferably, there are an equal number of satellites in the two ground tracks, and the orbits of the satellites are further configured such that when one satellite is at the end of an active arc in one ground track and in the process of being deactivated, another satellite is at or near the beginning of the corresponding active arc in the other ground track and being reactivated. At the changeover point the two satellites must be near enough to allow a ground station to follow what appears to be a single active satellite in a closed path in the sky overhead without having to break lock and slew to a new position when satellite changeovers occur. However, the orbital parameters of the satellites in the first and second ground tracks are preferably selected such that at the points where the ground tracks cross, the satellites are far enough apart in space that they do not actually collide.

Preferably, the satellites in each ground track are equally spaced in mean anomaly to achieve the greatest number of satellites enabled at the same time. "Mean anomaly" represents the fraction of an orbit period that has elapsed since the satellite passed through perigee, as expressed in degrees. For example, the mean anomaly of a satellite two hours into an 8-hour orbit is 90 degrees (one quarter of the period).

Continuous communication at the preferred 50 percent duty cycle requires a minimum of three evenly spaced satellites in each ground track. Adding more basic groups of six satellites to the two ground tracks creates additional orbital capacity. In the preferred embodiment, the orbital parameters allow up 12 satellites to be placed in each active arc of the ground track while maintaining a minimum angular spacing between satellites of at least 2 degrees.

In another aspect of the invention, each of the satellites in the constellation has an orbital height lower than the height necessary for geostationary orbits. This aspect of the invention has the benefit of reducing satellite size and weight for a given communications capacity, reducing launch requirements, and reducing satellite transmission delay. Also launching into elliptical orbits requires less energy than circular orbits, further reducing launch vehicle costs.

To minimize perturbation effects caused by the earth's shape, the present invention also preferably uses the critical orbital inclination of 63.4 degrees. This is the inclination of the orbital plane that results in a stable elliptical orbit whose apogee always stays at the same latitude in the same hemisphere.

In another aspect of the present invention, the orbits of satellites are configured such that the portion of the satellites' orbits during which communications equipment is enabled, is separated from the earth's equatorial plane by at least a predetermined amount. This feature avoids potential interference with existing satellites in the geostationary ring and allows the communications frequencies allocated to geostationary satellites to be reused for the non-geostationary constellation of the present invention.

In a further aspect of the present invention, each satellite has a power system configured to generate an amount of power less than that required when the communications equipment on the satellite is enabled, and more than that required when the communications equipment is not enabled. The power system can store the excess power generated when the communications equipment is not enabled, and use the stored power to supplement the generated power to meet the requirements of the communications equipment when it is enabled. For the preferred embodiment with a duty cycle of 50 percent, satellite weight saving resulting from this power conservation scheme can be significant.

In yet a further aspect of the invention, satellites are added to the constellation to form additional pairs of ground tracks having the same shapes as the first and second ground tracks, but displaced in longitude by a predetermined amount. The amount of longitudinal displacement is such that at all times each of the satellites in the active arcs of the additional ground track pairs is separated by at least a predetermined angle from any of the active satellites in other ground track pairs. The preferred embodiment, with satellites in orbits having a mean motion of three and operating at a 50 percent duty factor, can accommodate four pairs of ground tracks having 24 active arcs (i.e., 12 closed paths) in each hemisphere, or a total of 48 active arcs worldwide. If each arc is filled with a maximum of 12 active satellites, the total number of equivalent non-geostationary satellite slots that the present invention can support is 576, or more than three times as many as the existing geo stationary ring, assuming minimum two-degree satellite spacing.

DETAILED DESCRIPTION OF THE INVENTION

Figure 1:
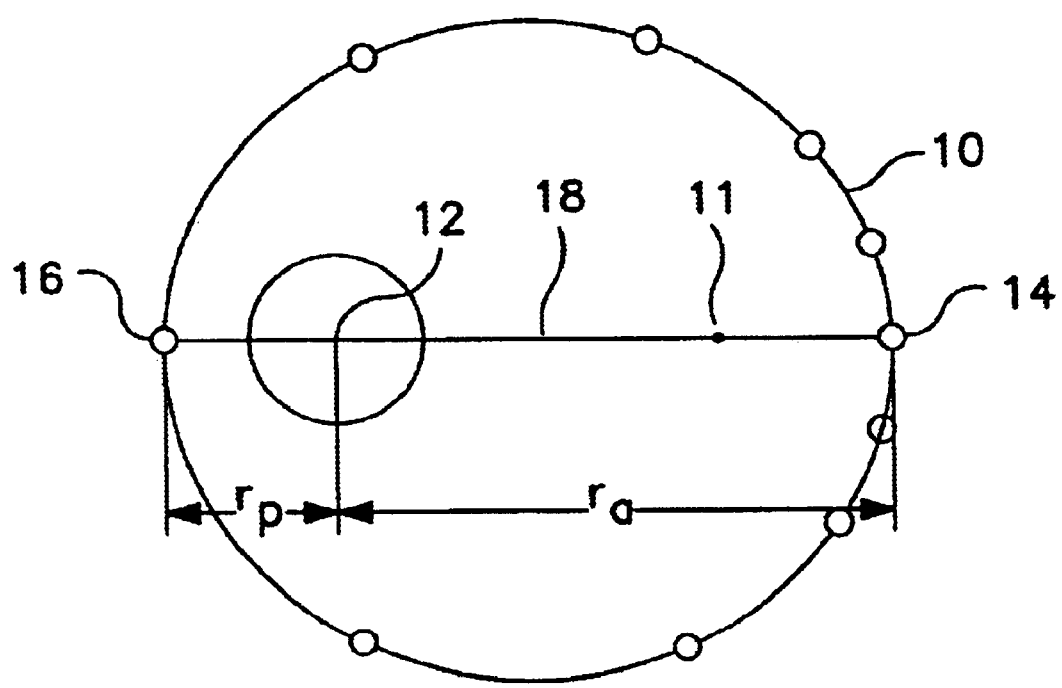
FIG. 1 shows the basic characteristics of an elliptical satellite orbit including the bunching together of satellites near apogee.

The present invention is directed to a communications system including ground stations and a constellation of satellites in elliptical orbits that emulate many of the characteristics of geostationary satellites from the viewpoint of the ground stations on the earth. As explained in greater detail below, the satellites of the present invention, like those of the prior art system, are in elliptical orbits and operate in a portion of their orbits near apogee. The orbital parameters of the satellites are adjusted such that these active arcs are in the Northern and Southern Hemispheres, outside of the equatorial region. In the prior system, as a satellite is turned off at the end of an active arc, it is replaced by another satellite that is being turned on at the beginning of the arc. Accordingly, any ground station that has been tracking the satellite as it moves slowly through its active arc, must quickly re-point its antenna beam to the beginning of the arc as the replacement satellite arrives.

The present invention permits a ground station to continuously track the active satellites without having to slew the ground station antenna beam between the turn-off position of the departing satellite and the turn-on position of the arriving satellite. As explained in detail below, this is accomplished by using a "left-leaning" elliptical ground track active arc together with a "right-leaning" elliptical ground track active arc. The parameters of the satellite orbits are adjusted such that the end points of the two active arcs coincide, the turn-off point of one arc being the same as the turn-on point of the other. As shown in detail below, the combination of the two active arcs creates an upside-down, teardrop shaped closed pattern in the Northern Hemisphere, or an upright teardrop pattern in the Southern Hemisphere. The active arcs of the left-leaning satellite tracks exhibit satellite motion from south to north, in the Northern Hemisphere, while the right leaning arcs contain active satellites moving from north to south. An observer on the ground in the Northern Hemisphere region served by satellites in these ground tracks observes the active satellites moving slowly in a counter-clockwise direction looking upwards into the sky, at generally high elevation angles. At the changeover points, which occur about every four hours for satellites in the 8-hour orbits of the preferred embodiment, the ground station antenna momentarily "sees" two satellites at virtually the same azimuth and elevation location, so that no "slewing" maneuver is required when switching from the satellite in one ground track being deactivated to satellite in the other ground track being activated. No discontinuity in active satellite position, or antenna beam pointing direction, will be observed at the ground antenna. The ground station antenna will experience changes only in the angular azimuth and elevation tracking rates as the switchover is made from one ground track to the other. In the preferred embodiment, the switchover is controlled from a master ground control station and can be accomplished without an interruption in service.

The present invention takes advantage of the fact that satellites in elliptical orbits spend more time near the apogees of their orbits, when they are farther from the earth, than near their perigees. FIG. 1 shows a typical elliptical orbit 10 having two foci 11 and 12. The satellite orbits along the path of the ellipse 10, with the center of the earth being at focus position 12 (the "occupied focus").

The apogee 14 and perigee 16 of the orbit are defined by the points on the ellipse farthest from and closest to the occupied focus, respectively. The major axis of the ellipse 18 runs through the two foci of the ellipse, from apogee 14 to perigee 16. One-half of the major axis is referred to as the semi-major axis, a; it is from this parameter that the orbital period is uniquely determined. The two lengths along the semi-major axis, from the apogee 14 and perigee 16 to the occupied focus 12 are called the "radius of apogee" and the "radius of perigee", respectively. The amount of difference between these distances defines the eccentricity of the ellipse. In terms of the semi-major axis, a, and eccentricity, e, the radius of apogee and the radius of perigee are:

$$r_a = a \cdot (1+e); \tag{1}$$

and $$r_p = a \cdot (1-e) \tag{2}$$

The greater the eccentricity, the less the ellipse resembles a circle.

The position of a satellite in an elliptical orbit follows Kepler's second law of motion, which states that the orbiting satellite will sweep out equal areas of the orbit in equal times. This results in the satellite moving rapidly when it is at or near perigee and moving slowly when it is at or near apogee. For an 8-hour orbit, for example, a satellite will spend more than four hours near apogee. The circles on the ellipse of FIG. 2 mark off even time intervals in the motion of a satellite about the orbit, and show clearly how the satellite slows down and dwells for an extended period of time near apogee.

The present invention defines a system using a constellation of satellites chosen to operate such that the desired point on the earth always tracks and communicates with a satellite at or near apogee. By using prograde orbits, those in which the satellite is rotating in the same directional sense as the earth, the satellites at apogee can be made to appear to move very slowly, or even stop momentarily, in the sky.

Although the satellites in the present invention resemble geostationary satellites in that they appear virtually stationary when at or near apogee, typically moving at a rate of less than eight degrees per hour, each satellite does eventually leave its active arc, and, as explained in further detail below, is replaced by another satellite that enters the complementary active arc at the same time, and within view of the same ground stations. This characteristic means that unlike geo satellites, each satellite of the present invention does not operate 100 percent of the time. Outside of their active arcs, the satellites are typically not using their transmit and receive capability, and hence do not use a large portion of their power capacity.

Since each satellite is fully powered only part of the time, the satellite can be generating and storing power during the period when it is not active and then use it while in its active arc. Hence the satellite power source, typically arrays of solar cells, can be sized to provide only a fraction of the power needed during operation with the balance coming from the energy stored, typically in rechargeable batteries, during the inactive parts of its orbit. For example, since a satellite in the preferred embodiment is operating only 50 percent of the time, its power system can, in principle, be designed to generate 50 percent of the full load power from its solar arrays (plus whatever power is required to maintain housekeeping functions). This mode of operation can result in a significant saving in the weight and size of the satellites.

Before describing in detail the preferred satellite arrangement according to the present invention, the nomenclature utilized herein to describe the characteristics of satellite orbits will be first defined.

The term "mean motion", n, is a value indicating the number of complete revolutions per day a satellite makes. If this number is an integer, the ground tracks of the satellites repeat each day and each ground track for that day overrides the tracks of the preceding day. Mean motion is conventionally defined as the hours in a day (24) divided by the number of hours that it takes a satellite to complete a single orbit. For example, a satellite that completes an orbit every eight hours (an "8-hour satellite") has a mean motion of three. Integral mean motions of two, three and four are of particular applicability, but the present invention does not exclude higher values. As explained in further detail below, a small deviation from the exact integer value of mean motion is usually necessary to compensate for the perturbing effect due to non-sphericity of the earth, which is called "regression of the line of nodes."

The "elevation angles", $\delta$, is the angle from an observer's horizon up to the satellite. A satellite on the horizon would have zero degrees elevation while a satellite directly overhead would have 90 degrees elevation. Geo satellites orbit near the equator, and usually have a 20–50 degree elevation from points in the United States.

The "inclination", I or i, is the angle between the orbital plane of the satellite and equatorial plane. Prograde orbit satellites orbit in the same orbital sense (clockwise or counter clockwise) as the earth. For prograde orbits, inclination lies between zero degrees and 90 degrees. Satellite retrograde orbits rotate in the opposite orbital sense relative to the earth, so for retrograde orbits the inclination lies between 90 degrees and 180 degrees.

The "critical inclination" for an elliptical orbit is the particular planar inclination that results in a zero apsidal rotation rate. This inclination results in a stable elliptical orbit whose apogee always stays at the same latitude in the same hemisphere. Two inclination values satisfy this condition: 63.435 degrees for prograde orbits or its supplement 116.565 degrees for retrograde orbits.

The "ascending node" is the point on the equator where the satellite passes from the southern hemisphere to the northern hemisphere. The right ascension of the ascending node ("RAAN") is the angle measured eastward in the plane of the equator from a fixed inertial axis in space (the vernal equinox) to the ascending node.

For the present invention, the longitudinal spacing between the ascending nodes of different satellites in the constellation is called "S", and is uniform in the preferred embodiment.

The "argument of perigee" is a value that indicates the angular position in the plane of the orbit where perigee occurs. Arguments of perigee between zero degrees and 180 degrees locate the position of perigee in the northern hemisphere, and hence concentrate satellite coverage in the southern hemisphere. Conversely arguments of perigee between 180 degrees and 360 degrees locate the perigee in the southern hemisphere and hence concentrate coverage on the northern hemisphere.

"Mean anomaly", M, represents the fraction of an orbit period that has elapsed since the satellite passed through perigee, as expressed in degrees. For example, the mean anomaly of a satellite two hours into an 8-hour orbit is 90 degrees (one quarter of the period). The total mean anomaly over the period of a day for a satellite with mean motion n is simply n times 360 degrees.

Figure 2:
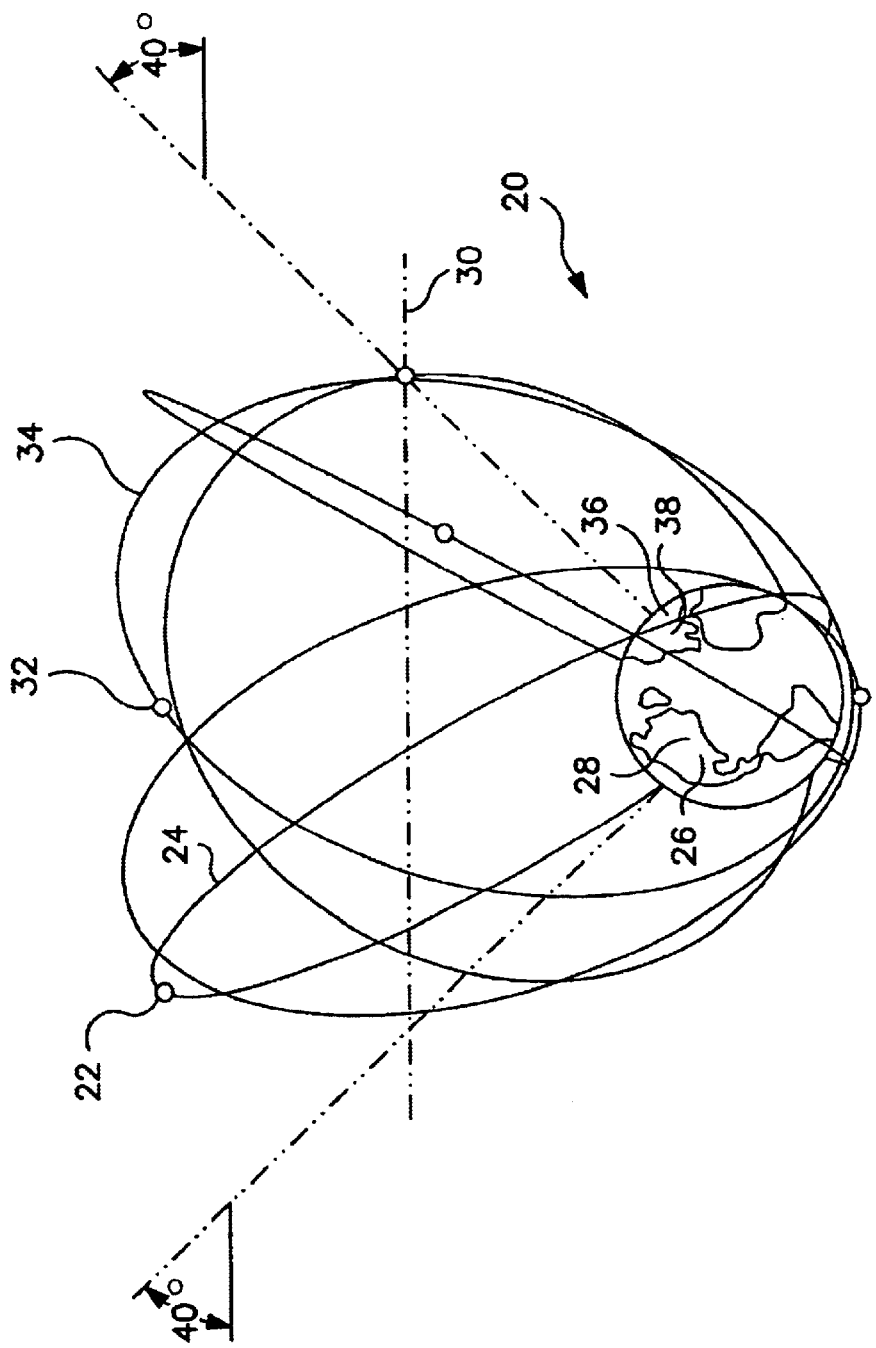
FIG. 2 shows a perspective view of five elliptical orbits having one satellite in each orbit according to the prior art.
Figure 3:
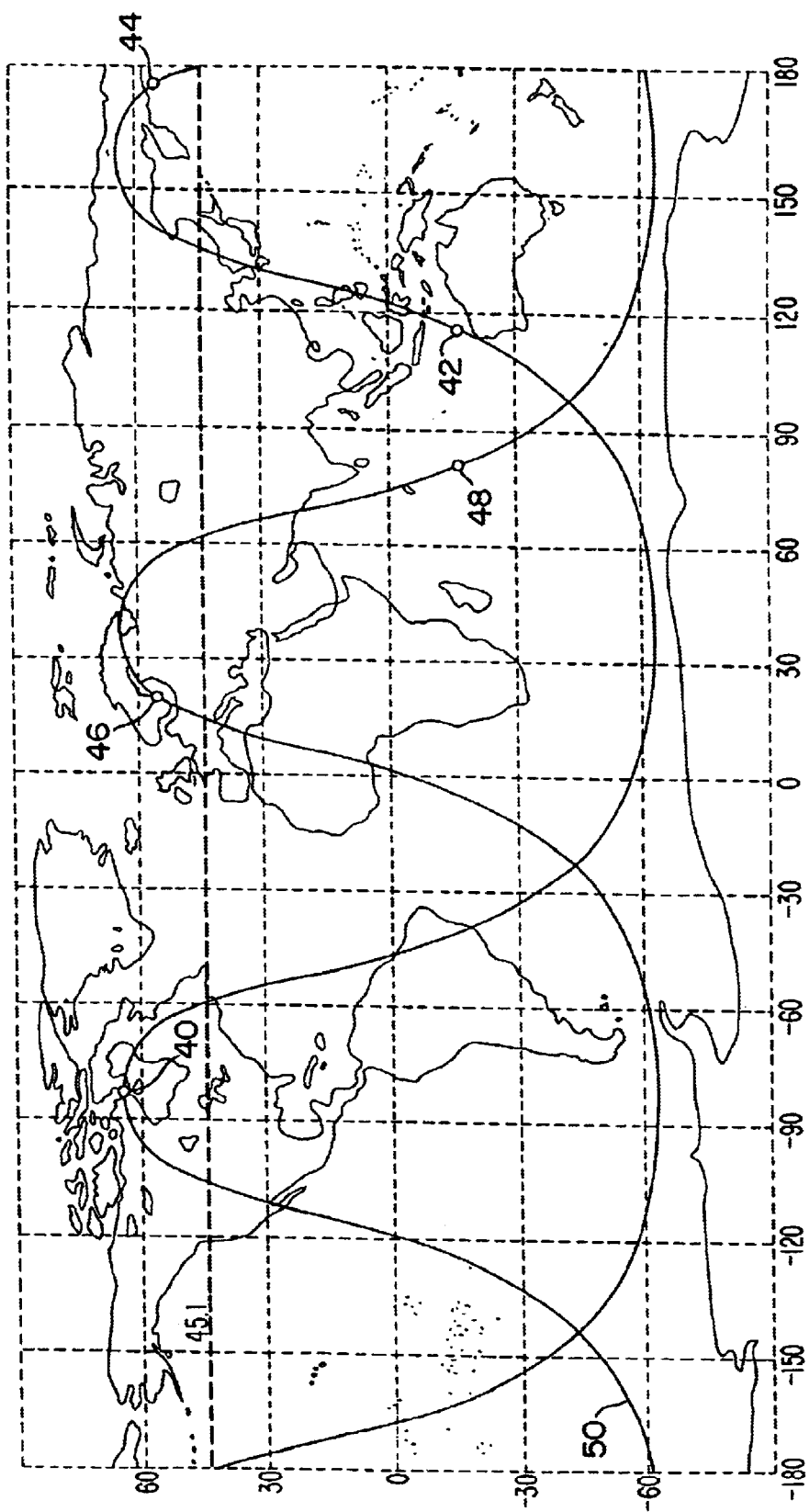
FIG. 3 is a Cartesian plot showing a ground track for the elliptical orbits of FIG. 2 according to the prior art.

FIG. 2 depicts the basic elliptical-orbit satellite array, generally designated 20, of a prior art system proposed by Virtual Geosatellite LLC in an application filed before the Federal Communications Commission (FCC) in January 1999. The entire system proposed in the application employs three such arrays of satellites, two arrays covering the northern hemisphere and one covering the southern hemisphere, each array having five 8-hour satellites emulating many of the characteristics of geo satellites.

In FIG. 2, virtual geo satellite 22 is shown in elliptical orbit 24 around the earth. The communications equipment on satellite 22 communicates with earth ground stations 26 and 28. Virtual geo satellite 32, shown in a separate elliptical orbit 34, is at the same time in communication with ground stations 36 and 38.

Like geo-based systems, the virtual geo satellites implemented in accordance with the prior art system are virtually continuously in the same general location or region in the sky. Unlike geo-based systems, however, the ground communications equipment of the prior art system does not always communicate with the same satellite. For example in the illustrated embodiment, ground stations 26 and 28 are initially in communication with satellite 12, but are later in communication with satellite 32 that is in elliptical orbit 34. The virtual geo satellites move slightly relative to the earth when they are at or near apogee. However, virtual geo satellite 22, for example, which is shown at apogee, later moves to perigee, and still later to other locations over other areas of the earth including, for example, ground stations 36 and 38. The prior art system allows for operation over specific geographic locations that are preferentially covered. For example, continental landmasses can be covered by the constellation to the exclusion of other areas, such as the oceans between the continents. In the illustrated prior art embodiment, for example, the United States, Europe and portions of Asia and Russia are preferentially covered.

To preclude interference with satellites in the geo ring, the communications equipment on the satellites of the prior art system is disabled when the satellites are within a predetermined distance 30 from the earth's equatorial plane. As discussed in further detail below, this provides an angular separation of at least 40 degrees, as viewed from the earth, between geo satellites and those of the prior art system.

Figure 4:
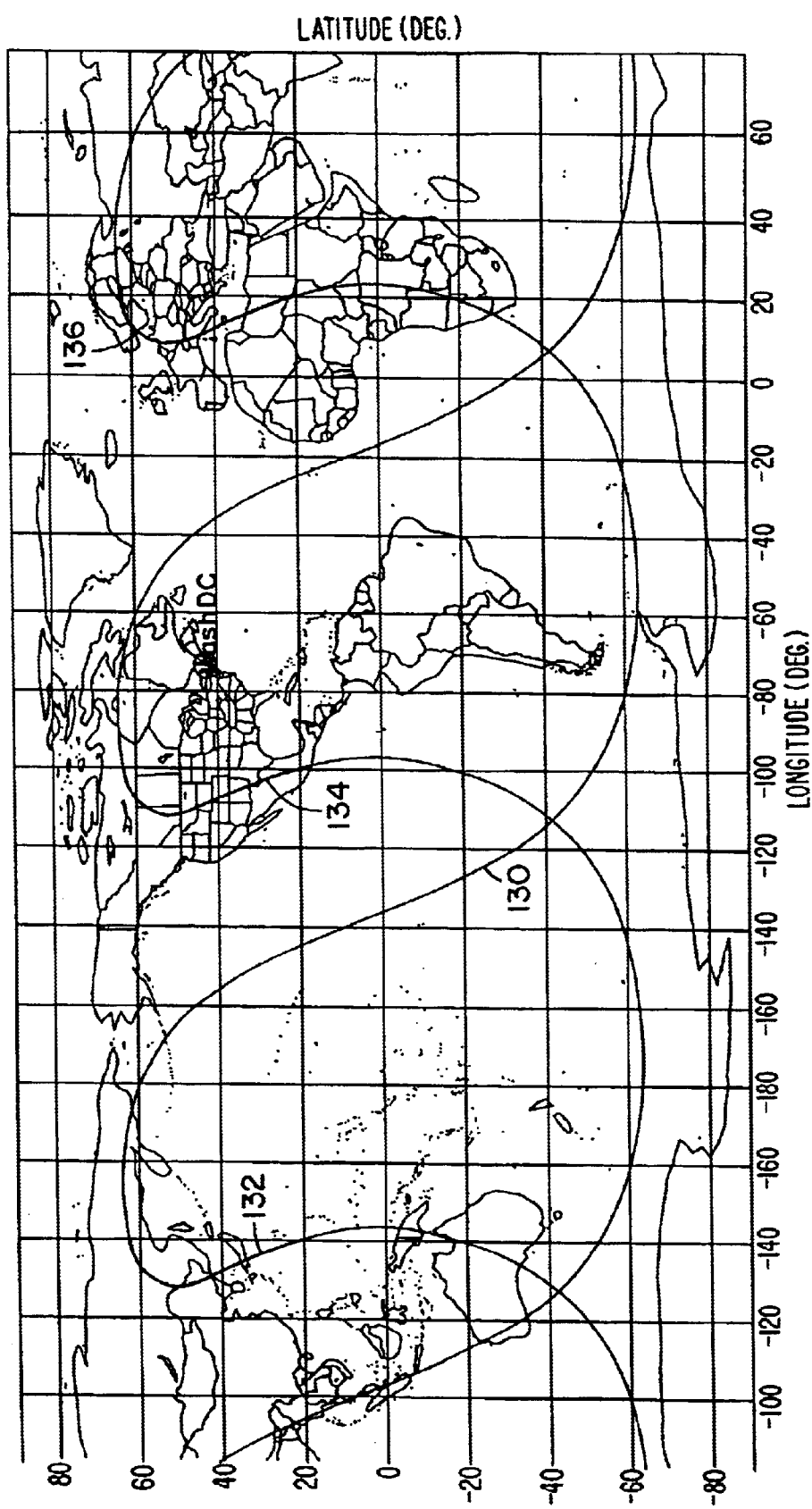
FIG. 4 is a Cartesian plot showing a left-leaning repeating ground track according to the present invention.
Figure 5:
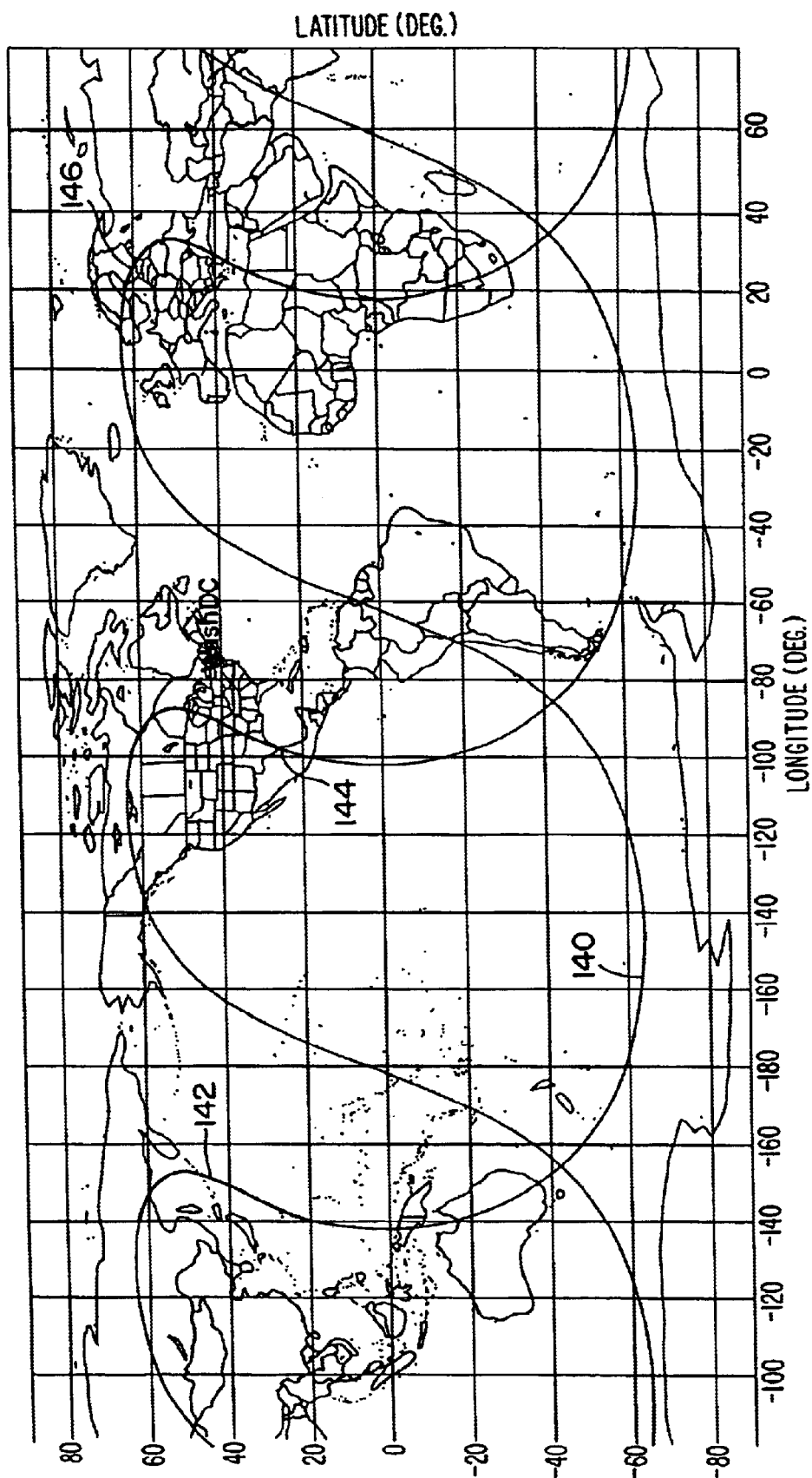
FIG. 5 is a Cartesian plot showing a right-leaning repeating ground track according to the present invention.

The five satellites depicted in FIG. 4 are in orbits that have the same values for radius of apogee, radius of perigee, argument of perigee, inclination and mean motion, but are spaced in RAAN and in mean anomaly such that they all follow a common ground track. FIG. 5 shows a plot of the ground track 50 in Cartesian coordinates superimposed on an equidistant cylindrical projection of the earth, for the prior art five-satellite array of FIG. 4. (Note that the plot of the single ground track 38 actually "folds over" from the left edge of the world map to the right edge, giving it the appearance of multiple traces.) In the prior art system, the satellites have a mean emotion of three, thus making three orbits of the earth each day. The orbits are equally spaced around the axis of the earth, and are equally spaced in mean anomaly. For the five satellites the orbital spacing in longitude, S, is set equal to 72 degrees. In order to have the five satellites in the five different orbits all follow the same ground track, their spacing in mean anomaly must be n times S, or 216 degrees. As can be seen from FIG. 5, the satellites, having mean motion three, make three loops around the world. In general, the number of loops in the ground track will be the same as the mean motion. The positions of the loops can be shifted east or west in longitude to target different coverage areas by adjusting the RAANs of all of the orbits of the array while maintaining their relative spacing. In the prior art system depicted, the argument of perigee is 270 degrees, which makes the loops symmetrical about the apogee of the orbits. As the apogee is in the northern hemisphere, the prior art system shown favors coverage of the northern hemisphere. As can be seen, there is one satellite 40, 44, 46 in each of the active arcs at the top of the loops near apogee, and two inactive satellites 42, 48 in positions between the active arcs. In this particular case the ends of the active arcs are both at 45.1 degrees north latitude and the middle at 63.4 degrees north latitude, which is the same as the angle of inclination. This provides a very large separation (approximately 40 degrees) between the active arcs and the geostationary ring. The duty cycle of each satellite shown in FIG. 4 is 60 percent, meaning that each satellite is active for 60 percent of time, centered around its apogee. When an active satellite is about to leave one end point of an active arc, one of the inactive satellites appears at the other end point to take its place and is switched from an inactive state to an active state.

The prior art system offers the opportunity to add more satellites to each active arc and to insert a second ground track with an equal number of satellites, between the loops of the original ground track in each hemisphere. Each orbital position in each of the active arcs constitutes, in effect, an orbital slot, which in the prior art system has been dubbed a "V-slot". However, the possible number of such virtual slots for any orbital configuration is ultimately limited by the spacing between satellites at apogee within each active arc, and the spacing between satellites in the vicinity of the points where the active arcs of adjacent ground tracks intersect. It has been determined that the prior art virtual geo system can accommodate a maximum of 14 satellites in each active arc while still maintaining minimal 2 degree satellite spacing. If in addition, a second ground track is added to the southern as well as the northern hemisphere, raising the total number of active arcs to 12, then the maximum potential number of virtual sots is 14×12 or 168 virtual slots.

Because all of the active satellites in the prior art system are moving in one direction, essentially from west to east, it is necessary to slew each earth station antenna beam from the end of the active arc to the beginning of the active arc when the active satellite being tracked reaches its turn-off point. The present invention overcomes this shortcoming while also providing a significant capacity improvement over the prior art system.

In contrast to the prior art system, the basic array of the present invention utilizes elliptical-orbit satellites deployed in a pair of repeating ground tracks. FIG. 4 shows the first basic 24-hour repeating ground track 130 of the present invention, in which the argument of perigee falls between 180 degrees and 270 degrees, such that the orbital ellipse is no longer aligned with the axis of the earth, but is "leaning over" towards the equator. In the embodiment shown, the apogee occurs in the vicinity of 40 degrees latitude, which has the benefit of being close to high population densities at the middle latitudes, where such a system is likely to have greatest use. With a mean motion of three for the satellite orbits, there are three loops in the ground track. However, because the argument of perigee makes the orbits lean, the loops of the ground track are not symmetrical about a meridian of longitude, as they would be if the argument of perigee were 90 degrees or 270 degrees, but appear in the figure to lean to the left. The active arcs 132, 134, 136, highlighted in black, are on the left, or westward, side, side of each loop and, in contrast to the prior art system, oriented in a predominantly north-south direction. In the left leaning ground track shown, the satellites traverse the active arcs in a south-to-north direction.

In the embodiment shown, the active arcs represent the portion of each satellite orbit lying within one-quarter of an orbital period on either side of apogee. This means that the satellites are active 50 percent of the time and inactive during the other 50 percent of the time, and hence, have a 50 percent duty cycle. Satellites in these active arcs are turned on at the lower end of the arcs, at about 20 degrees north latitude, and move in a northerly direction until they reach the turn-off points, at about 61.5 degrees north latitude. The lower end of arcs, at about 20 degrees latitude, provides more than adequate angular separation from geostationary satellites in the equatorial plane. Note that the orbital parameters of the satellites forming ground track 130 have been carefully adjusted so that for each of the active arcs 132, 134, 136, the beginning and end points lie on the same meridian of longitude.

FIG. 5 shows the second basic 24-hour repeating ground track 140 of the present invention, which is a right-leaning version of the first basic ground track shown in FIG. 4. To make the northern loops of the second ground track lean to the right, or eastward, an argument of perigee between 270 degrees and 360 degrees is selected. In the preferred embodiment, the arguments of perigee selected for the satellites of the left- and right-leaning ground tracks are supplementary angles, that is, the ground tracks lean left and right by the same amount. The three active arcs 142, 144, 146 in FIG. 5 are highlighted in black. In this instance, the active arcs are on the right side of the ground track's northern loops, so that the satellites in these active arcs are moving in a southerly direction. As in the previous case, the orbital parameters of the satellites have been carefully tailored so that the start and end points of each active arc lie along the same meridian.

Figure 6:
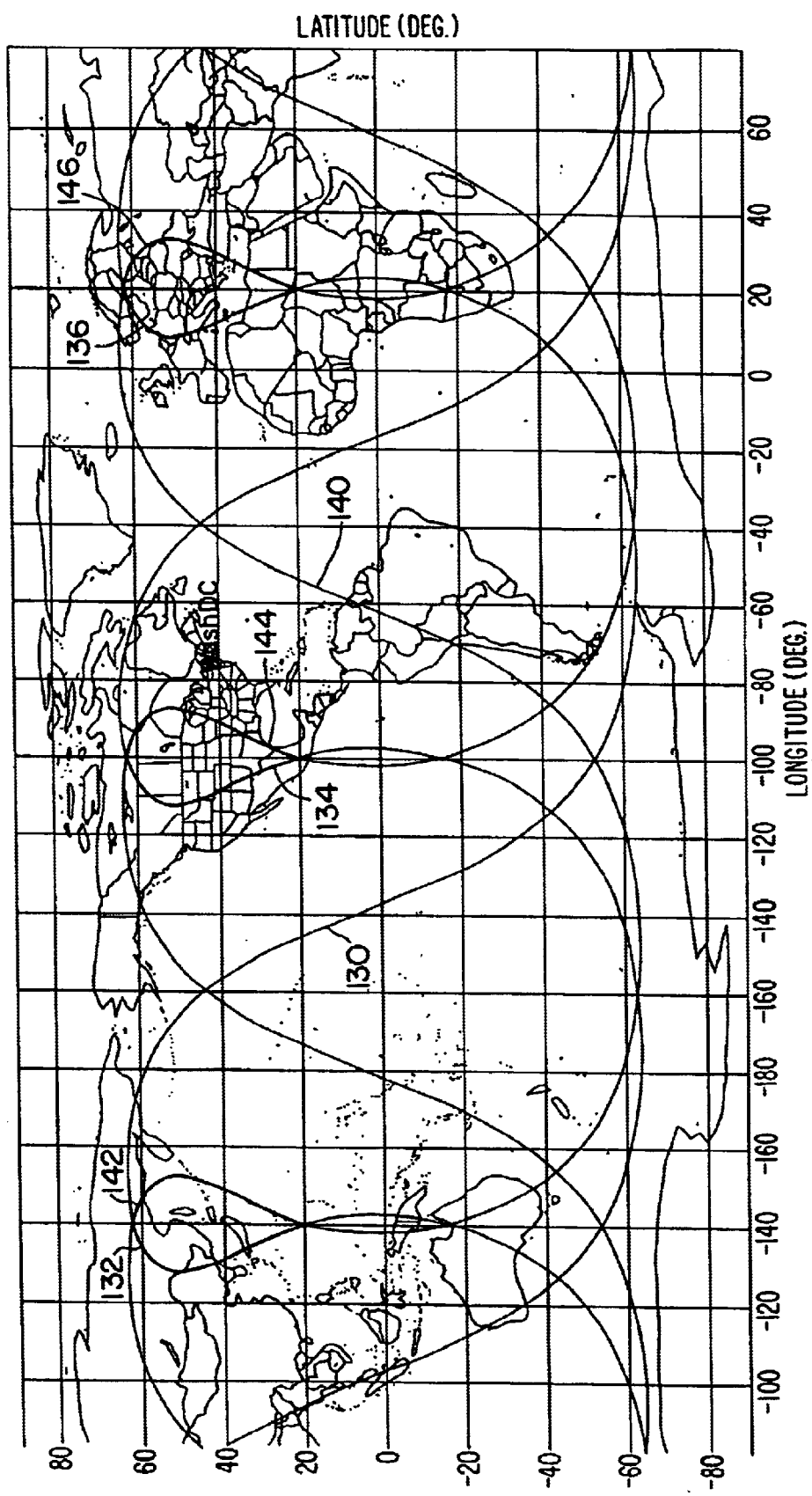
FIG. 6 is a Cartesian plot showing the left- and right-right leaning ground tracks of FIGS. 4 and 5 combined to form closed teardrop patterns according to the present invention.

FIG. 6 shows the results of combining the left- and right-leaning ground tracks 130, 140 of FIGS. 5 and 6. Again, the active arc portions of the ground tracks are highlighted in black for emphasis. The reason for beginning and ending the active arcs on the same meridian now becomes apparent, as the active arcs join to form a closed path. To allow continuous tracking of active satellites around the closed path, it is necessary to time phase the satellites in the system such that a northerly moving satellite that is just ending its active arc portion in the left-leaning ground track is met at the same location by a southerly moving satellite that is just beginning its active arc in the right-leaning ground track. In this way, as the master ground control station commands the simultaneous shut-down of the former satellite and turn-on of the latter, the antenna on a ground station tracking the former satellite merely begins receiving signals from the latter satellite and follows the motion of this active satellite until the next succeeding switchover occurs. A similar changeover occurs at the end of the active arcs closer to the equator, where the departing right-leaning track satellite is replaced by the arriving left-leaning track satellite.

The preferred embodiment of the present invention shown in FIG. 6, having satellites with a mean motion of 3, actually produces "teardrop" patterns covering three distinct areas in the Northern Hemisphere separated by 120 degrees of longitude, in this case the heavily populated regions of Japan and East Asia, the North American continent, and Eastern Europe. Of course, a similar, but inverted set of these teardrop patterns could be placed in the Southern Hemisphere, giving similar coverage to selected geographic regions.

Figure 7A:
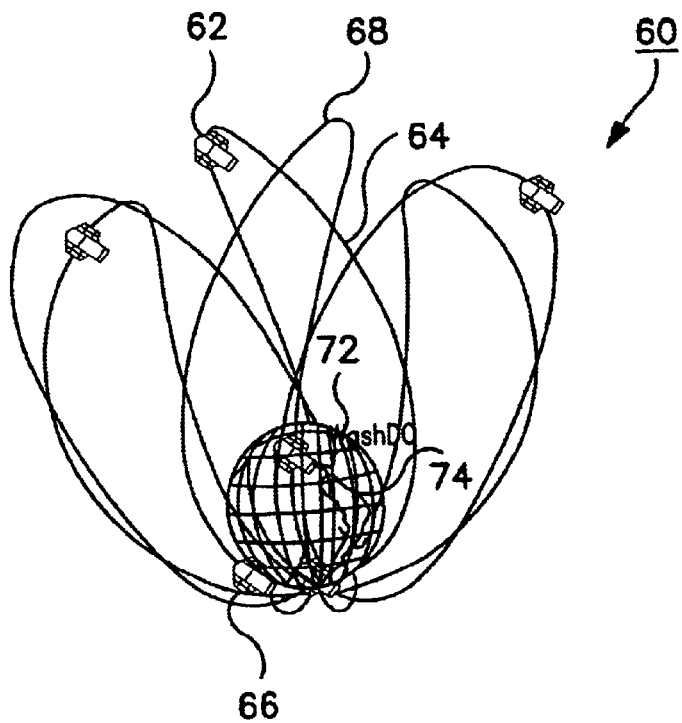
FIGS. 7A–7B show equatorial and polar perspective views of six elliptical orbits having one satellite in each orbit according to the present invention.

FIG. 7A depicts the orbits of a minimum, building block, system, according to the present invention, of six satellites, generally designated 60, that are properly time-phased to provide each closed-path teardrop pattern with one active satellite always visible at high elevation angles to a ground antenna in that surrounding geographic region (note that FIG. 7A is an earth-centered, fixed projection, i.e., with the earth not rotating). The six satellites are in elliptical orbits around the earth all having the same radius of apogee, radius of perigee, inclination and mean motion. The orbits of the three satellites forming the left-leaning ground track share the same values for argument of perigee and mean anomaly, and have RAANs that are evenly spaced at 120-degree intervals. Similarly, the orbits of the three satellites forming the right-leaning ground track share common values of argument of perigee and mean anomaly, which however, are different from those of the left leaning satellites. The difference between the two groups in mean anomaly is 180 degrees, so that when the left-leaning satellites are near apogee, for example, the right leaning satellites are near perigee. The arguments of perigee of the two groups of satellites are supplementary angles, meaning that the sum of the two arguments of perigee is 180 degrees. This can be seen from Table 1, below, which lists the orbital elements for the basic six-satellite array depicted in FIG. 7A. The orbital elements were developed by iteration, and may be further refined.

TABLE 1

ORBITAL ELEMENTS

| Sat # | a (km) | e | I (deg) | RAAN (deg) | ω (deg) | M (deg) |
|---|---|---|---|---|---|---|
| 1 | 20261 | 0.6458 | 63.41 | 138.5 | 232 | 180 |
| 2 | 20261 | 0.6458 | 63.41 | 18.5 | 232 | 180 |
| 3 | 20261 | 0.6458 | 63.41 | 258.5 | 232 | 180 |
| 4 | 20261 | 0.6458 | 63.41 | 100.2 | 308 | 0 |
| 5 | 20261 | 0.6458 | 63.41 | 340.2 | 308 | 0 |
| 6 | 20261 | 0.6458 | 63.41 | 220.2 | 308 | 0 |

In the basic, six-satellite system depicted in FIG. 7A, the communications system on satellite 62, for example, which is in orbit 64, communicates with earth ground stations 72 and 74 while it is in its active arc near apogee. Satellite 66, shown in separate elliptical orbit 68, is in the other ground track and inactive, but at a time half an orbital period later will be in communication with ground stations 72 and 74.

Figure 7B:
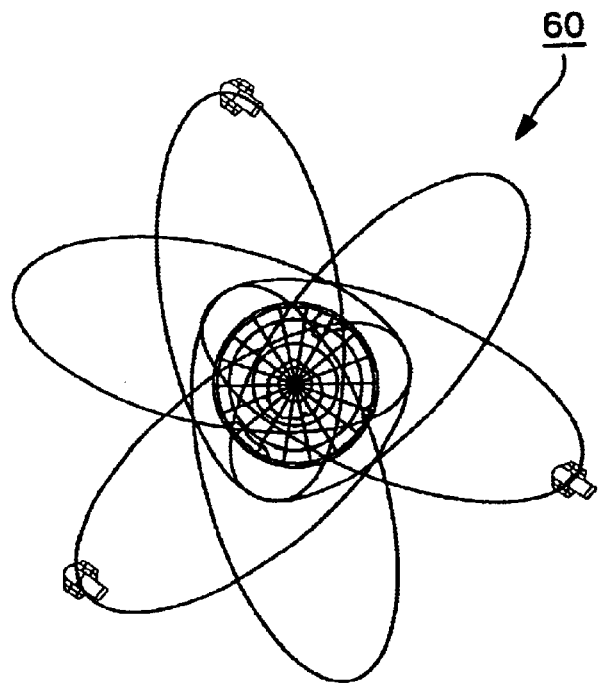

FIG. 7B shows the same basic six-satellite array of FIG. 7A looking up from the South Pole (note that FIG. 7B is a projection in inertial space, i.e., with the earth rotating). This perspective shows more clearly that while all of the elliptical orbits have the same basic shape, three lean in one direction and three in the other.

In the preferred embodiment, as discussed above, the satellite being turned off at the end of its active arc in one ground track, is at the same position in space as the satellite being turned on at the beginning of its active arc in the complementary ground track. To avoid the possibility of a mid-space collision, remote as it may seem, a slight deviation can be added to either the right ascension, the argument of perigee or the mean anomaly of the array of satellites forming one of the ground tracks. Varying one or more orbital parameters slightly in this manner causes the satellites to miss each other, although the orbital paths do cross. Varying the argument of perigee slightly causes the orbital paths to pass above and below one another, and is preferable because it avoids the possibility of a collision entirely. Clearly the deviation need only be very small to achieve the desired result without affecting the ability of a ground station antenna to "see" both satellites simultaneously, as they appear to cross in the sky.

Figure 8:
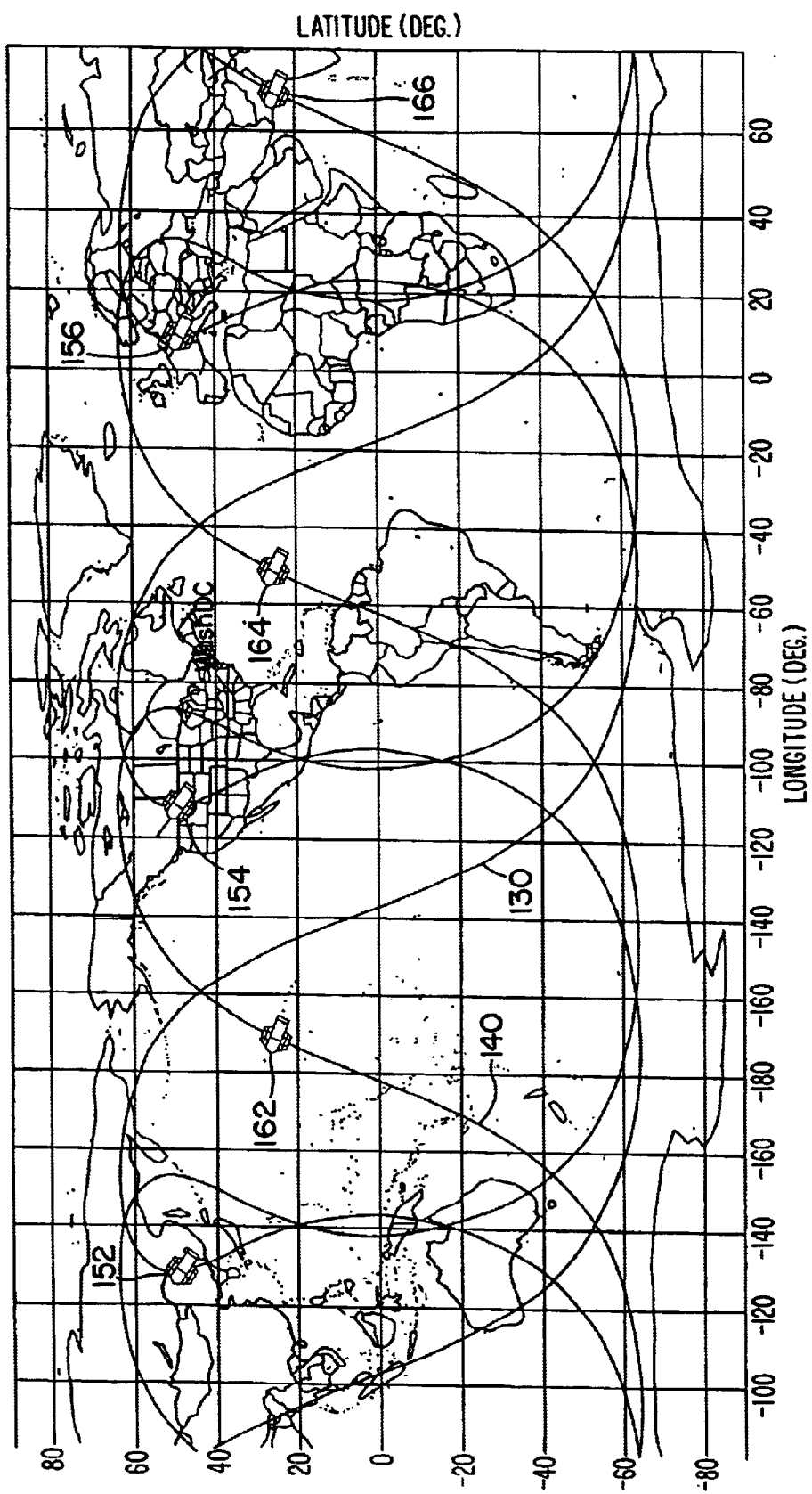
FIG. 8 is a Cartesian plot showing the basic six-satellite system of FIGS. 7A–7B.

FIG. 8 shows in Cartesian coordinates, the basic six-satellite system of FIGS. 7A–7B, at the time that the three satellites 152, 154, 156 in the left-leaning ground track 130 are in the active communication mode at approximately 48 degrees north latitude, and are traveling in a northerly direction. The other three satellites 162, 164, 166, at about 24 degrees north latitude, are in the inactive portion of their orbits, and in the process of moving toward their next turn-on positions. It can be seen, by tracing the ground tracks, that each satellite visits each of the three closed-loop teardrop patterns once per day, remaining active in that teardrop for about a four-hour active arc duration. This feature allows what is termed "graceful degradation" in the event of a satellite failure. In contrast with geostationary system, where loss of a single satellite serving a giving geographical area would result in a total loss of communications for the affected area, a single satellite failure in the present system would result in only a four hour outage in each coverage area during each 24-hour day. During each day, the outage would rotate among the three teardrop patterns, and not affect all of the coverage areas at the same time.

Figure 9:
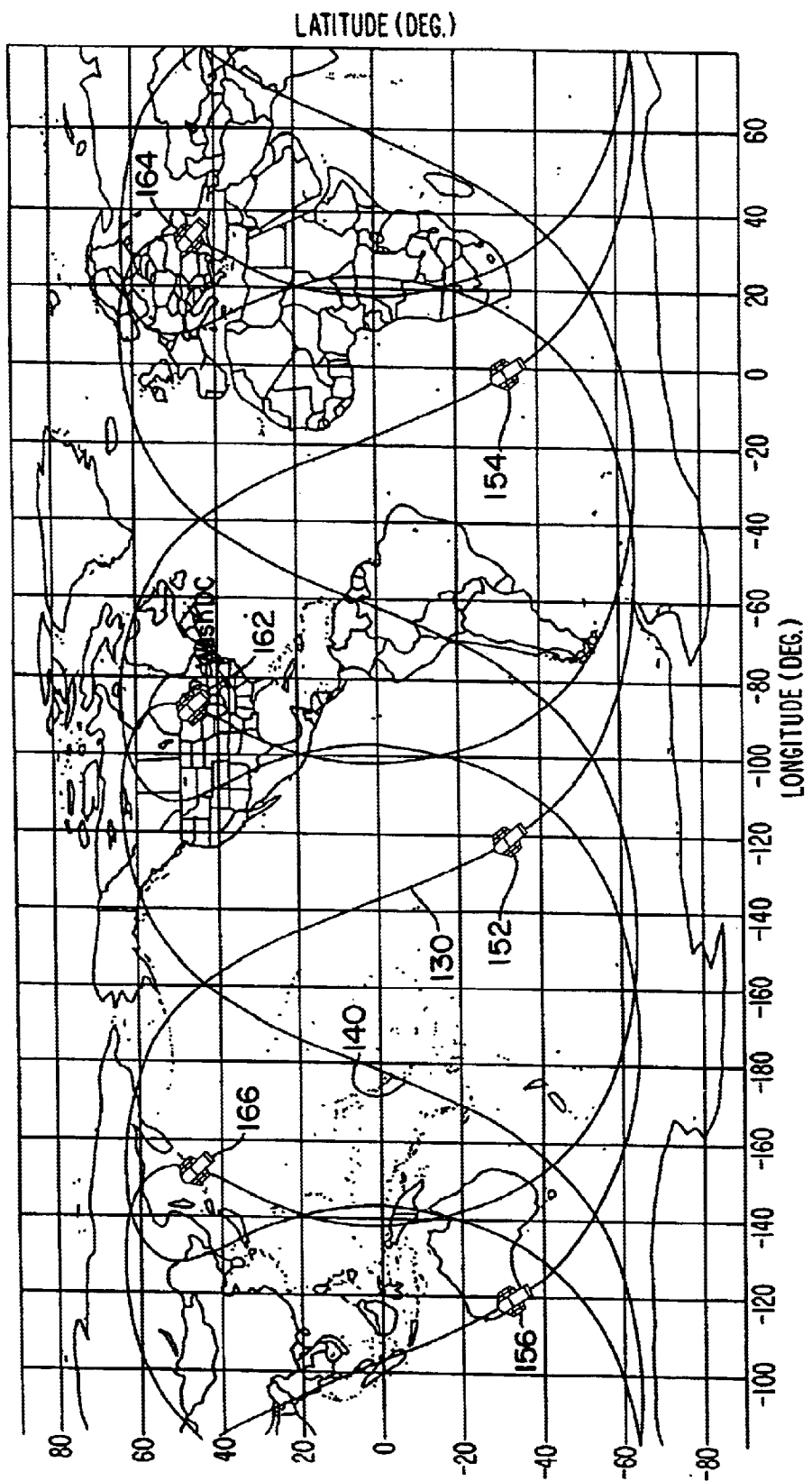
FIG. 9 is a Cartesian plot showing the same basic six-satellite satellite system as FIG. 8 at a later point in time.

FIG. 9 shows a similar picture as FIG. 8 at a later time, when the southerly moving group of satellites 162, 164, 166 has become active. In this view, the three inactive satellites 152, 154, 156 are actually in the Southern Hemisphere at 32 degrees south latitude, and closer to perigee than were the inactive satellites in the previous figure.

Figure 10:
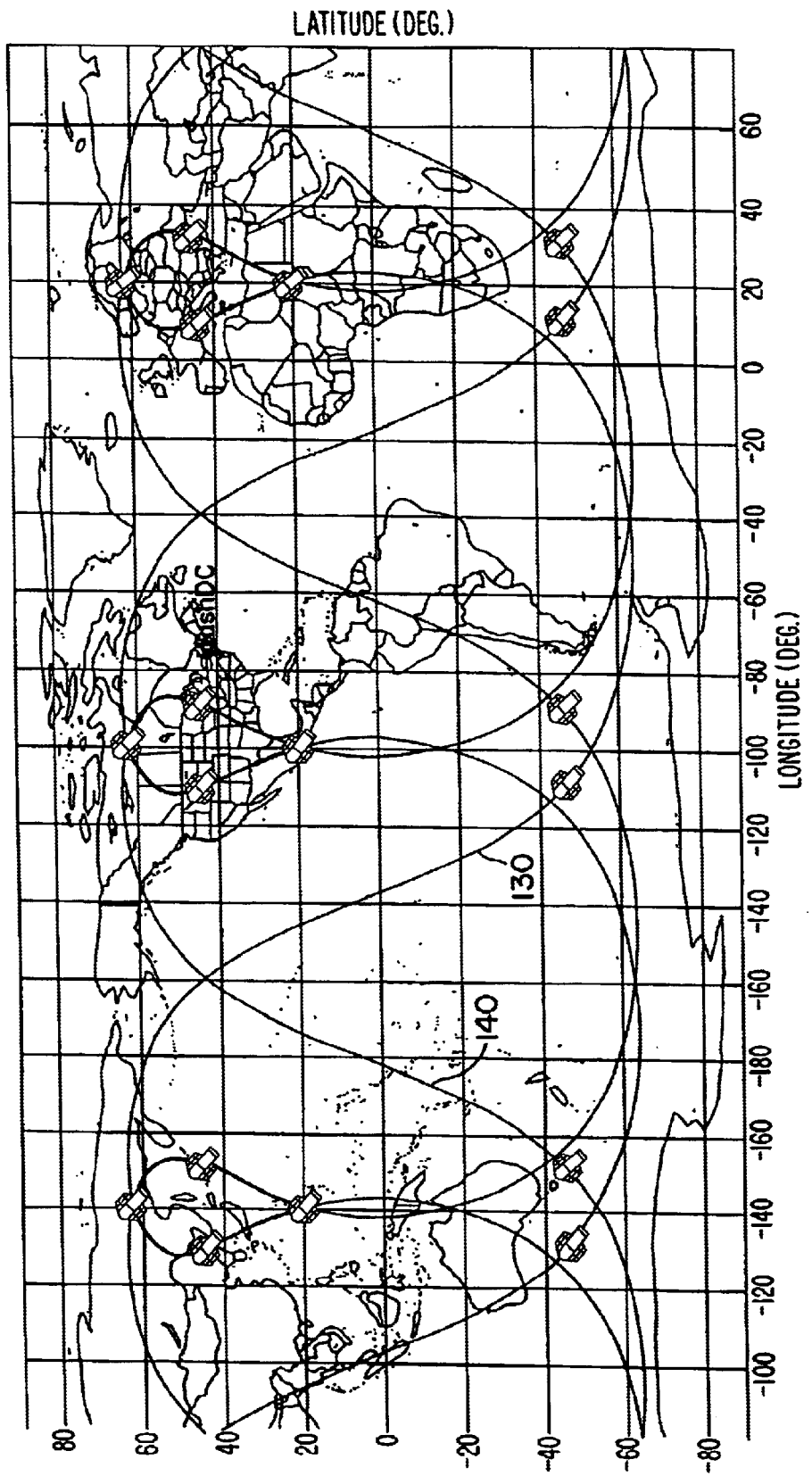
FIG. 10 is a Cartesian plot showing a constellation of twenty-four satellites according to the present invention having four active satellites in each closed teardrop pattern.

FIG. 10 shows a satellite constellation for Northern Hemisphere coverage, according to the present invention, that has four active satellites in each teardrop pattern, or a total of 12 satellites. At the instant shown, the six satellites at about 42 degrees north latitude are at apogee. At each end of each teardrop pattern, there are actually two satellites in or near the same position. One has just been turned on, and the other has just been turned off. In addition, there are six satellites at about 47 degrees south latitude that are at their perigee points. Note that this perigee point is not at 63.4 degrees south because the argument of perigee is not equal to 270 degrees, the same reason that the apogee is not at 63.4 degrees north.

Although FIG. 10 shows a system with four active satellites per tear drop pattern, a larger number of the above-described basic, six-satellite groups can be placed in the single pair of left- and right-leaning ground tracks. In the teardrop pattern, the critical region in terms of inter-satellite spacing, appears to be at the cusp, the point at which the active arcs meet closest to the equator. It has been found, by iteration, that up to 12 active satellites can be supported in the northerly-moving satellite path, plus a corresponding 12 active satellites in the southerly-moving path, for a total of 24 active satellites per teardrop pattern. This maximum capacity per teardrop is achieved on the basis that all the satellites in each ground track, both active and inactive, are equally spaced in mean anomaly.

The location of the closed loop teardrop patterns may be shifted at will in longitude by incrementing the RAANs of the satellites that form the paired ground tracks. Thus, selected market areas may be addressed, recognizing that this will be a global system, and that each system will cover three similar areas spaced 120 degrees apart in longitude. Although the latitudinal coverage pattern may not be shifted, the system inherently covers the mid- and higher latitudes much more effectively than a geo system, as the satellites are more directly overhead for these latitudes.

Communications system capacity can be multiplied for the present invention by creating additional ground track pairs displaced in longitude around the earth. However, spacing between teardrop patterns must be maintained so that one teardrop pattern does not approach closer than two degrees to its nearest adjacent neighbor. It has been found that for the preferred embodiment, up to 12 "teardrops" can be placed in the Northern Hemisphere without any mutual interference, and a like number of 12 can be placed in an inverted manner in the Southern Hemisphere. Thus, in all a total of 24×24, or 576 active satellites could be placed in such a system. If this number of active positions, or slots, is compared to the 180 possible slots in the geo ring, the present invention represents a potential global communication satellite capacity that is greater by a factor of 3.2 (576/180)!

Figure 11:
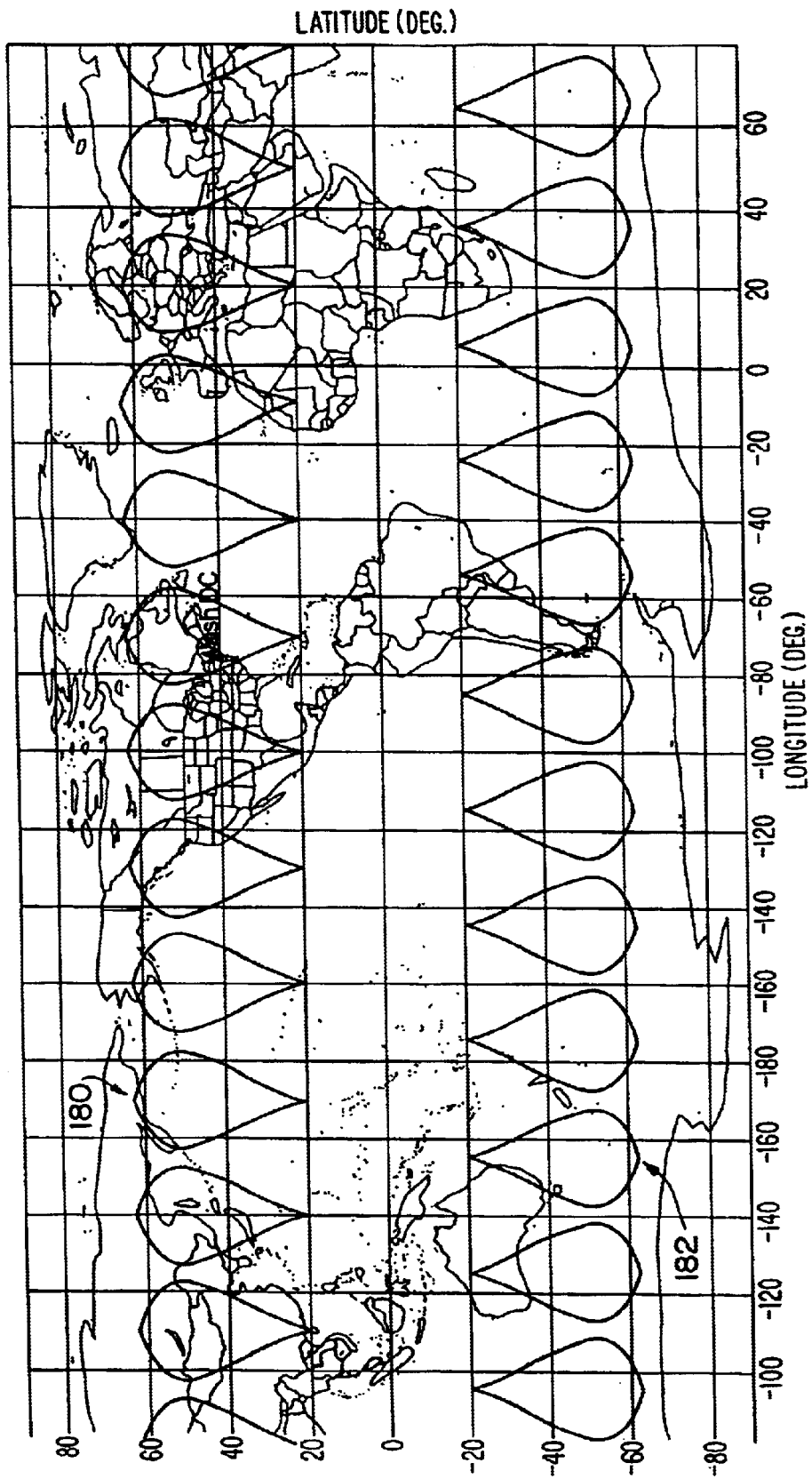
FIG. 11 is a Cartesian plot showing 12 teardrop patterns in the Northern Hemisphere and 12 teardrop patterns in the Southern Hemisphere according to the present invention.

FIG. 11 is a plot in Cartesian coordinates showing the 12 teardrop closed paths 180 in the Northern Hemisphere, and the 12 teardrop patterns 182 in the Southern Hemisphere, discussed above.

Figure 12A:
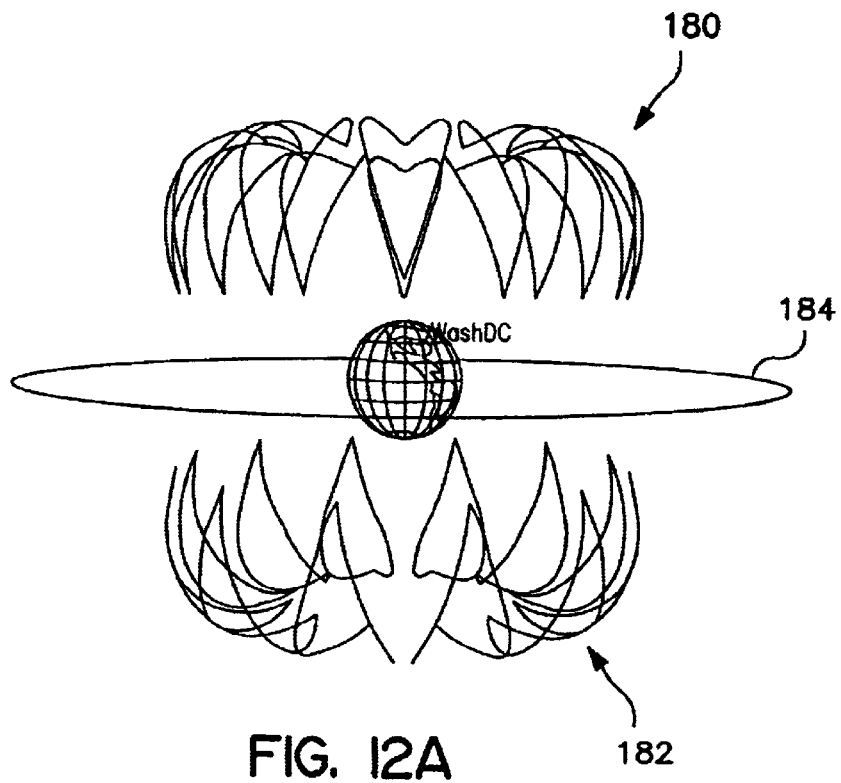
FIGS. 12A–12B show equatorial and polar perspective views of the 24 teardrop patterns of FIG. 11.

FIG. 12A illustrates the same teardrop patterns in inertial space from a perspective slightly above the earth's equatorial plane. This view shows clearly the angular separation between the geo ring 184 and the teardrop patterns 180, 182.

Figure 12B:
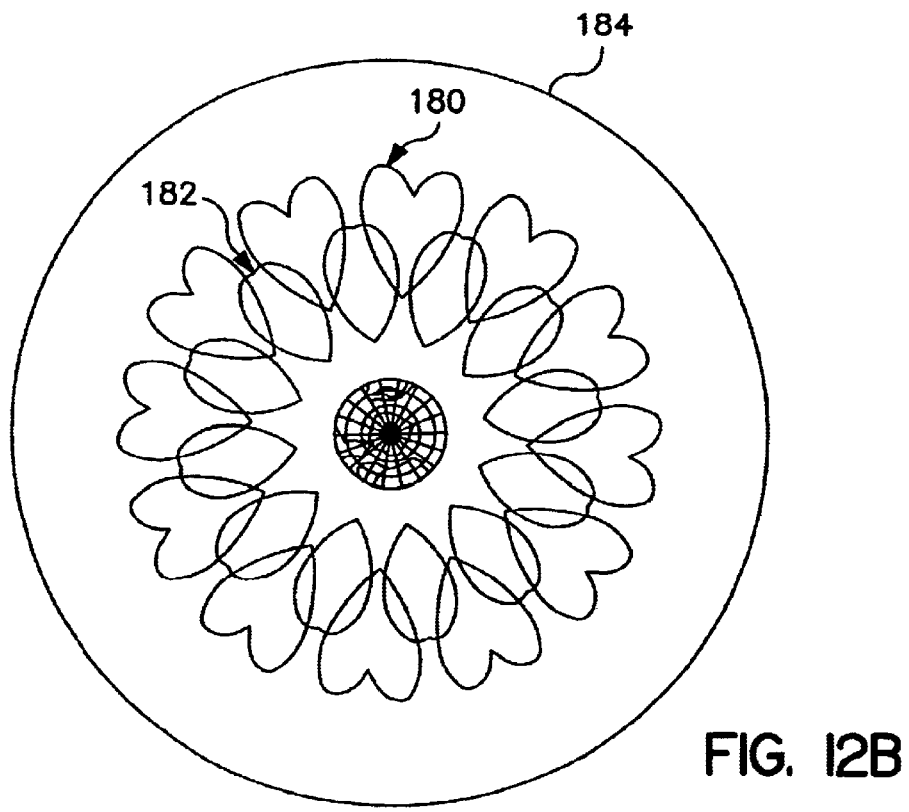

FIG. 12B illustrates the teardrop patterns in inertial space from the perspective of an observer above the earth's North Pole. Because the perspective is from a distance of 130,000 miles above the north pole, the teardrops in the Southern Hemisphere, which are further away, appear smaller, although in reality are the same size as the Northern Hemisphere teardrops. This view also shows more clearly that the orbital altitudes of the satellites according to the present invention are well within the altitude necessary for geostationary orbit.

Figure 13:
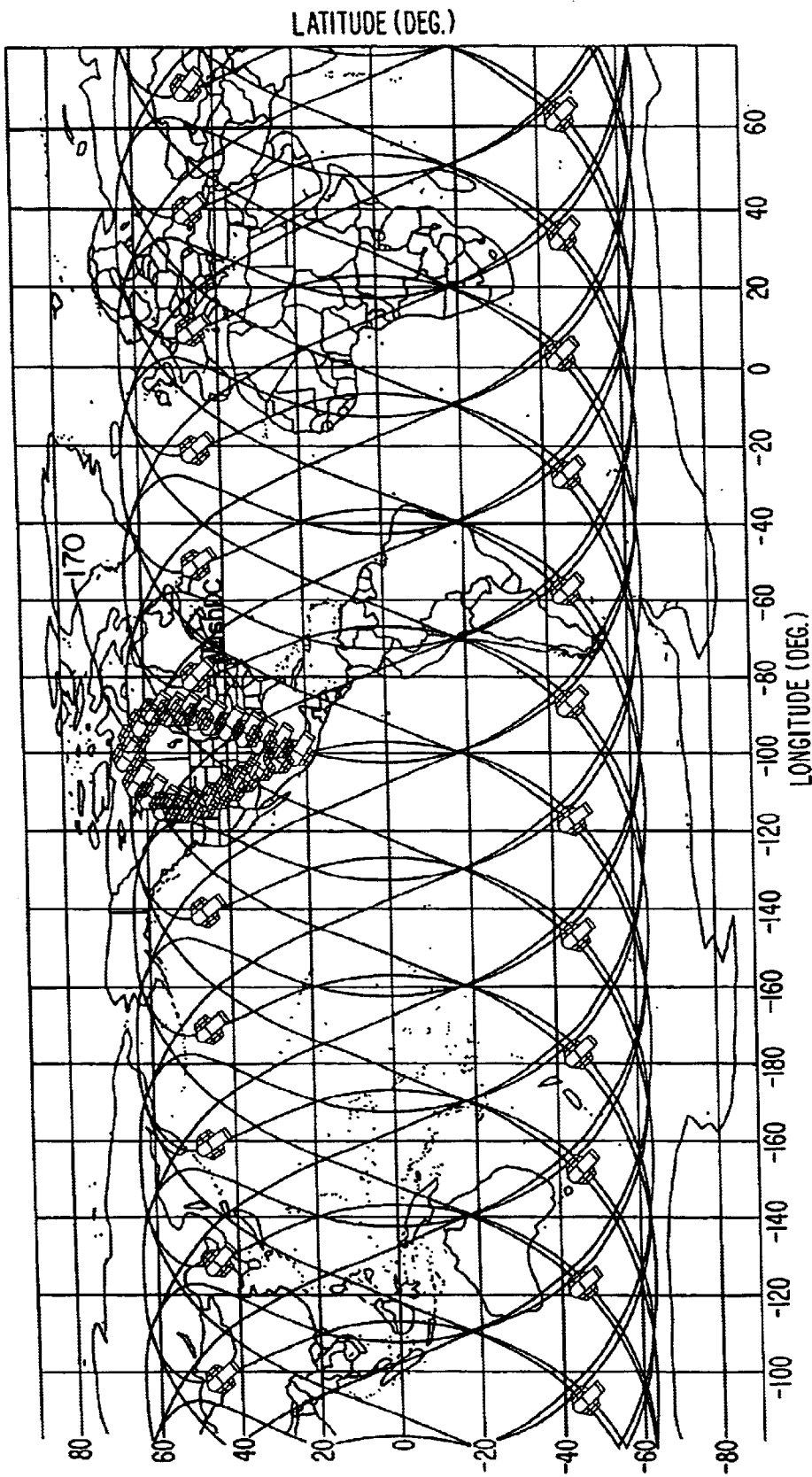
FIG. 13 is a Cartesian plot showing a constellation of satellites according to the present invention having twelve teardrop patterns in the Northern Hemisphere, one of which has twenty-four active satellites.

FIG. 13 illustrates the 12 teardrop closed paths that can be accommodated in the Northern Hemisphere, with 24 active satellites 170 shown occupying one of the teardrop patterns. The other patterns each have one active satellite shown.

It should be noted that all elliptical orbits, including those described herein are subject to effects of long-term perturbations, which if not compensated, cause the desired satellite coverage to drift off with the passage of time. These perturbation effects result from the earth's J2 rotation harmonic, which reflects the fact that the earth is not a perfect sphere, but actually bulges at the equator. The two principal effects are regression of the line of nodes for posigrade orbits (I>90 degrees), and rotation of the line of apsides. For inclinations greater than critical (I between 63.4 degrees and 116.6 degrees) the line between the perigee and the apogee for each satellite (the line of apsides) will regress; for other inclinations (I<63.4 degrees or >116.6 degrees) the line of apsides will progress. At exactly the critical angles of 63.4 degrees or 116.6 degrees, the line of apsides will remain stable, a very desirable effect which is used to advantage in the preferred embodiment for maintaining apogee at a selected latitude. For inclined elliptical orbits there will be a regression of the line of nodes that must be compensated by a small adjustment in orbital period. All the satellites in a given array design are affected similarly. The effect is to cause the plane of the orbit to rotate clockwise as seen looking down on the North Pole. If that happens, the satellite would pass over a selected meridian at a slightly earlier time each day. Fortunately this effect can be compensated by slightly decreasing the period of each satellite in the array to effectively stretch out the trajectory ground track and cause the ground track to repeat exactly over the life of the satellite.

Figure 14A:
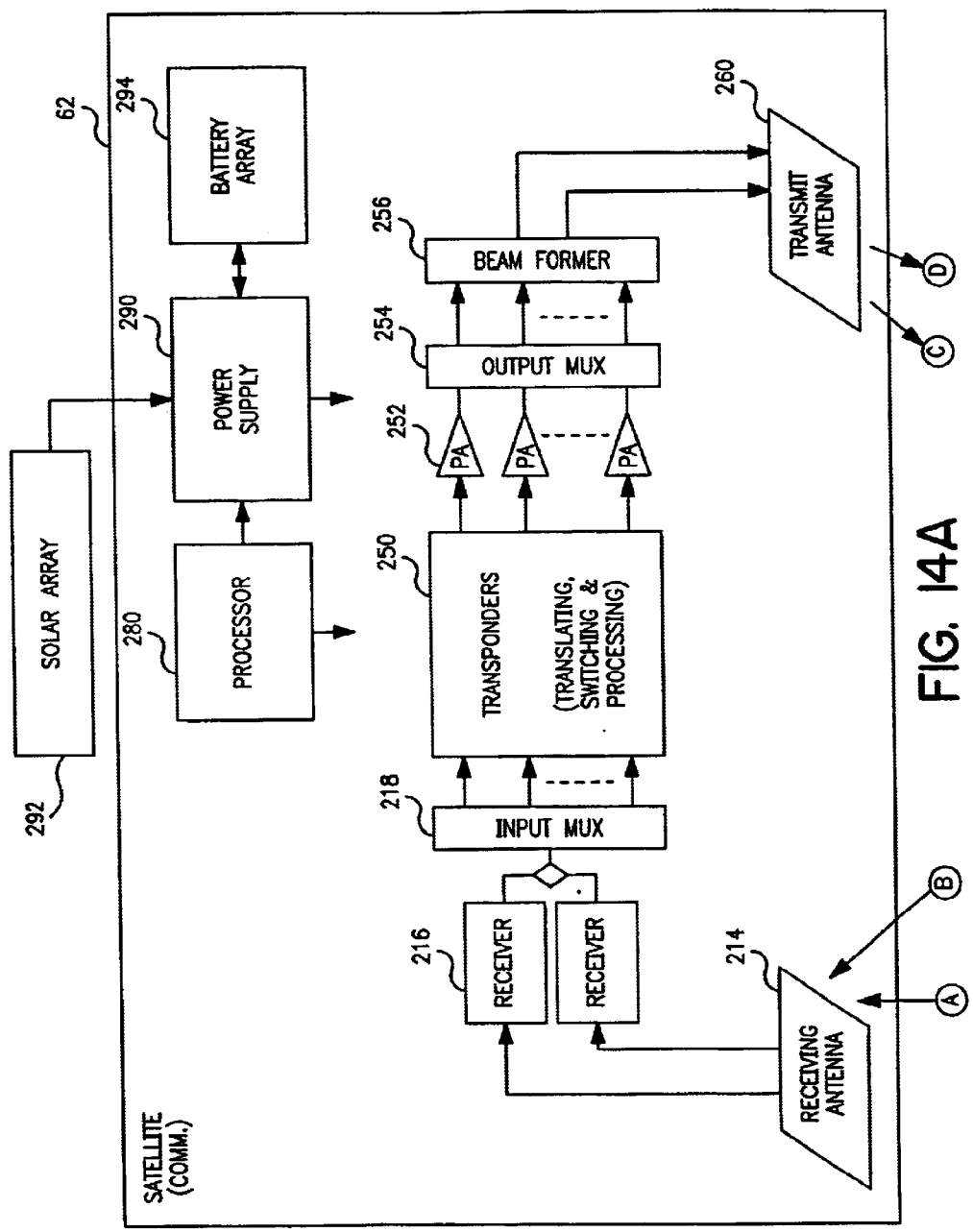
FIGS. 14A–14B are block diagrams showing a layout of typical satellite and ground station communications equipment used according to the present invention.
Figure 14B:
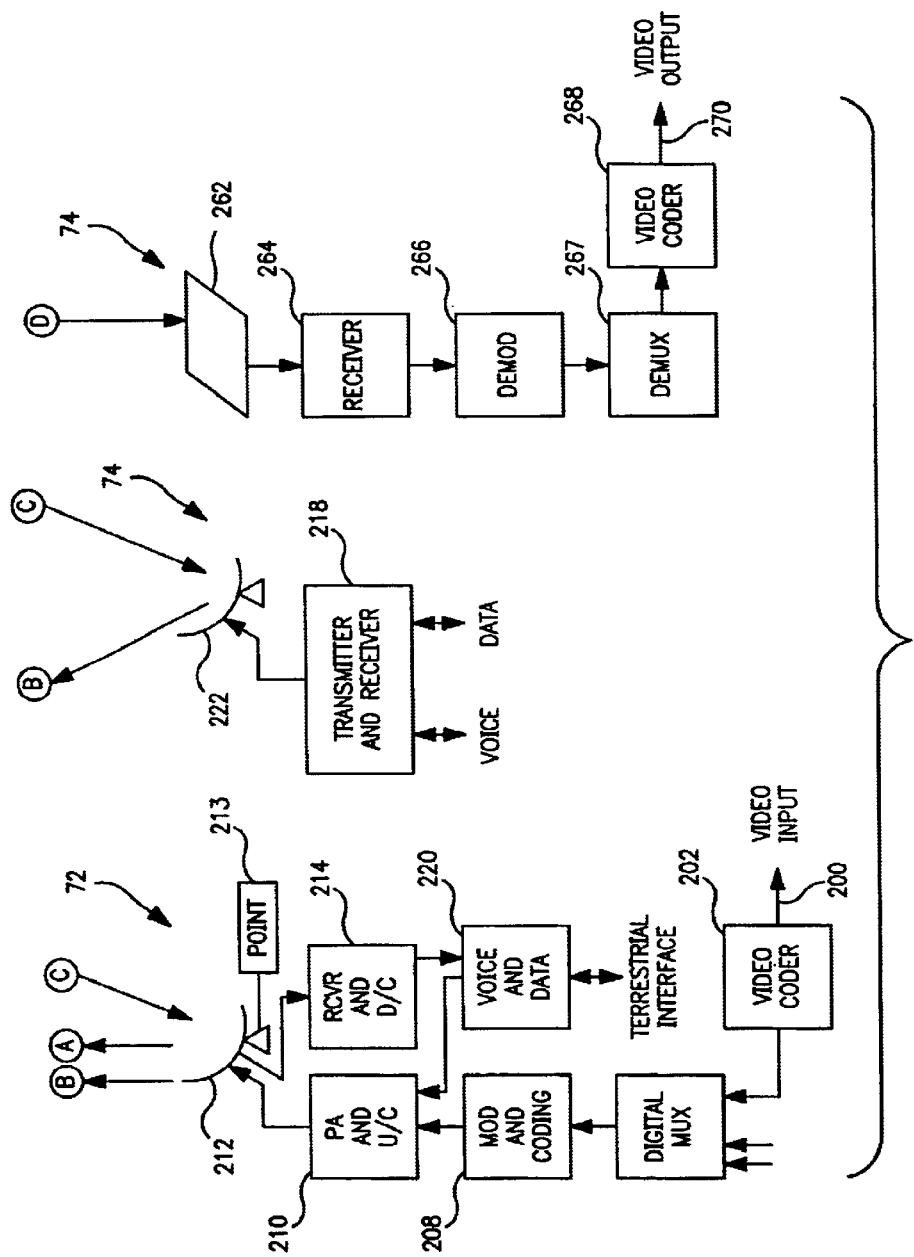

As will be apparent to a person of skill in the art, the system of the present invention has applicability to a broad variety of satellite communications services, including telephone, broadband data, television distribution, direct broadcasting and mobile communications, as well as to non-communications services, such as meteorology and earth resources monitoring. FIGS. 14A–14B provide, by way of example, block diagrams of the satellite and ground stations that can be used for television distribution and data transmission services in accordance with the present invention. The block diagrams show elements that can be used, for example, to carry out communication between the ground station 62, satellite 42, and ground station 64 of FIG. 8A.

Referring to FIG. 14B, video information to be distributed is received as video input 200, and input to a video coder 202 which processes digital coded video information. This digital coded video is multiplexed with a number of other channels of video information by video multiplexer 204. The resultant multiplexed video 206 is modulated and appropriately coded by element 208 and then up converted by transmitter element 210. The up-converted signal is transmitted by antenna 212 via link "A". Antenna 212 is pointed at satellite 42 and is controlled by pointing servos 213.

Referring now to FIG. 14A, the transmission from antenna 212 is received by phased array antenna 214 of satellite 42. The received signal is detected by one of the receivers 216, from which it is input to multiplexer 218. The output of multiplexer 218 feeds the transponders 250, where the received signal may be translated in frequency, switched among a number of transponder channels, or otherwise processed in some way, either at RF, IF or baseband. From the transponders, the signal typically goes through power amplifier 252 and multiplexer 254 to feed beam former 256. Beam former 256 drives a transmit, steerable phased array antenna 260 which transmits the signal in a current geo frequency band to steerable antenna 262 in the remote user terminal 64, of FIG. 14B. This signal preferably uses the same frequency that utilized by current geo satellites for such services. The phased array antenna 260 is steered by an on-board computer that follows a preset and repeating path, or from the ground. At user terminal 64 in FIG. 14B, the signal on link "D" is received by receiver 264 through steerable antenna 262, demodulated at 266, demultiplexed at 267 and decoded at 268 to produce the video output 270.

In the alternative, user terminal 64 may include an antenna 222, and transmitter and receiver 218 capable of two-way transmission of voice and data over links "B" and "C". Correspondingly, central ground station 62 would include a receiver and down-converter 214, and equipment to support two-way voice and data. Typical data applications include multi-media and Internet services.

In addition to the communications functions, FIG. 14A depicts an on-board processor 280, which determines the orientation of the satellite and steering of the satellite antennas from various parameters. Power supply 290 supplies and regulates electrical power for all the various satellite subsystems and components that require such power. Power supply 290 includes a source of power, here shown as solar array 292, and an energy storage element, here showed as a battery array 294. Importantly, according to the present invention, the solar array 292 is sized to provide an amount of power that is less than that required to fully power the satellite communications functions of the satellite, the fraction being referred to herein as the power ratio of the satellite. The power ratio depends on the kind of orbit that the satellites will have, and how long the satellites will be transmitting during the elliptical orbit. The preferred embodiment of the present invention has a nominal power ratio of 0.5, to power a satellite that is communicating half of the time. (Some small amount of power must be generated to maintain housekeeping functions even when the communications equipment on a satellite is disabled.) The other half of the time, the transmitters and receivers on-board the satellite are disabled, allowing solar array 292 to provide power to charge battery 294.

Figure 15:
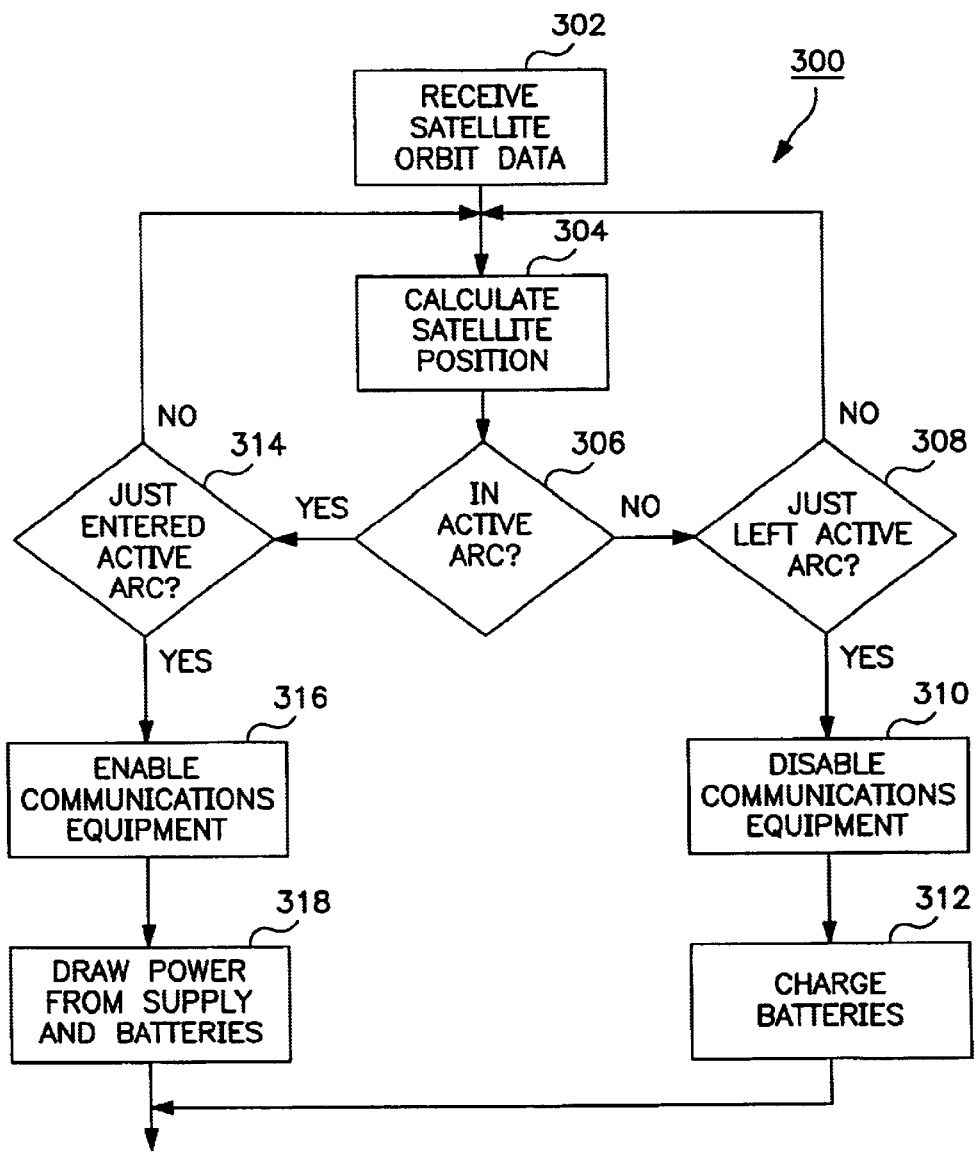
FIG. 15 is a flowchart showing a power consumption methodology of a satellite according to the present invention.

FIG. 15 depicts this power consumption methodology of a satellite of the present invention in a flowchart format that is generally designated 300. Step 302 represents receiving satellite orbit data from one or more ground station antennas tracking the satellites. Step 304 represents calculating at any given time the position of each of the satellites in orbit from the received orbital data. This requires that a processor at the master ground control station, mentioned earlier, record and process the orbital data as it is being received. At step 306 the processor determines whether each of the satellites is, or is not, within its respective active arc. If at step 308, it is determined that a satellite has just left its active arc, a command is sent at step 310 to disable the on-board satellite communications equipment. In that case, the satellite power supply 290 is also commanded at step 312 to use the power generated by the solar array 292 to charge the battery array 294. If at step 314 it is determined that a satellite has just entered its active arc, a command is sent at step 316 to enable the satellite's on-board communications equipment, and at step 318 the necessary power is drawn from the power supply and the battery. An independent on-board means, such as a programmed timer, may be included in the satellite on-board processor to ensure that the satellite's communications equipment is disabled when it is not in an active arc, and thereby avoid any possibility of interference with satellites in the geo ring.

As noted, operating the satellites only in the region of apogee prevents interference with satellites in the geostationary ring. In the present invention, the active orbital arcs are well away from the equator because coverage has been optimized to place satellite apogee, where the satellites spend most of their time, over high traffic density areas in the Northern and Southern Hemispheres. The present invention will allow existing geo satellite frequency allocations to be reused many more times and help to reduce the intense worldwide pressure on scarce spectrum resources.

In addition to avoiding possible interference with the geostationary ring, the present invention provides high elevation angles to the satellites while in their active arcs. Maximizing elevation angle materially reduces the atmospheric effects, blockage and multi-path that often adversely affect communication with geo satellites. These advantages are particularly attractive for satellite communications in higher frequency bands (e.g., 20–100 GHz) where atmospheric attenuation becomes a significant impairment.

Although the satellite system according to the present invention performs in many of its aspects like a geostationary satellite system, the satellites in the system orbit at a significantly lower altitude. A geostationary satellite orbits at 36,000-kilometer altitude, while the 8-hour satellites of the present invention, for example operate at an altitude between approximately 21,000 and 26,000 kilometers in their active arcs. Because the path loss of the communications link to satellites in these elliptical orbits is significantly less than the path loss to geostationary orbit, both the power and antenna size of the communications package on the satellites can be reduced accordingly.

A lower orbital altitude also yields benefits in terms of the cost of launching the satellites. Unlike geo satellites, satellites in elliptical orbits do not require apogee motors to boost them into final orbit. This factor alone reduces by approximately half the launch vehicle lift requirement per satellite. In addition, the reductions in size and weight of the satellite power and communications systems, mentioned above, all add to the benefits of present invention from viewpoint of launch costs.

It should be noted that, unlike satellites in the geostationary ring, satellites according to the preferred embodiment must be added in increments of six, filling three teardrop patterns equally spaced around the world. However, for the reasons earlier discussed, the cost of constructing and launching the six satellites in a basic array should compare very favorably with that of three gee satellites providing equivalent global services.

Use of the present invention significantly simplifies the tracking of non-geostationary satellites. Ground station antennas follow what appears to be a single active satellite in a roughly circular closed path in the sky overhead without having to break lock and slew to a new position when satellite changeovers occur, which makes the present invention a more attractive alternative to geo satellites. In addition, the present invention offers an increase in available world communication capacity for a variety of applications, does not interfere with satellites in the existing geostationary ring, provides a global system of communications satellites with a higher average elevation angle and lower transmission delay than geo systems, and offers lower overall construction and launch costs than comparable gee satellite systems.

While this invention has been described in reference to illustrative embodiments, the description is not intended to be construed in a limiting sense. Various modifications and combinations of the illustrative embodiments, as well as other embodiments of the invention, will be apparent to persons skilled in the art upon reference to the description. It is therefore intended that the appended claims encompass any of such modifications or embodiments.

What is claimed is:

1. A constellation of satellites, comprising:
   a first plurality of satellites in orbits around the earth having apogees and perigees, each of the first plurality of satellites being configured to be active only during a predetermined portion of the satellite's orbit proximate to apogee, the orbits of the first plurality of satellites having a first argument of perigee and being configured to form a first common ground track, the first common ground track repeating daily and having a number of first active arcs each corresponding to the predetermined portion of each satellite's orbit during which the satellite is active, the orbits of the first plurality of satellites being further configured such that each one of the first active arcs begins and ends at points on a same meridian of longitude; and
   a second plurality of satellites in orbits around the earth having apogees and perigees, each of the second plurality of satellites configured to be active only during a predetermined portion of the satellite's orbit proximate to apogee, the orbits of the second plurality of satellites having a second argument of perigee being a supplementary angle to the first argument of perigee, and being configured to form a second common ground track, the second common ground track repeating daily and having a number of active arcs corresponding to the predetermined portion of each satellite's orbit during which the satellite is active, the orbits of the second plurality of satellites being further configured such that each of the second active arcs begins at a point coincident with the ending point of one of the first active arcs, and ends at a point coincident with the beginning point of the same one of the first active arcs.

2. A constellation according to claim 1, wherein the orbits of the first plurality of satellites and the second plurality are further configured such that at all times there is at least one satellite in at least one of
   (i) each of the first active arcs and
   (ii) each of the second active arcs.

3. A constellation according to claim 2, wherein the first plurality of satellites has a first number of satellites and the second plurality of satellites has a second number of satellites equal to the first number of satellites, and the orbits of the first plurality of satellites and the second plurality are further configured such that at any time one of the first plurality of satellites is at a beginning point of one the first active arcs, one of the second plurality of satellites is simultaneously at or near a coincidental ending point of one of the second active arcs.

4. A constellation according to claim 3, wherein the orbits of the first plurality of satellites and the second plurality are further configured such that satellites do not collide at points where the first and second ground tracks cross.

5. A constellation according to claim 3, wherein the satellites in each of the first ground track and the second ground track are equally spaced in mean anomaly.

6. A constellation according to claim 3, wherein the first plurality of satellites and the second plurality of satellites are further configured such that at all times each of the satellites in any one of the first active arcs and the second active arcs is separated by at least a predetermined angle, as viewed from the earth, from each other satellite in the same active arc.

7. A constellation according to claim 1, wherein the orbit of each satellite of each of the pluralities of satellites is inclined at critical inclination.

8. A constellation according to claim 1, wherein each satellite of each of the pluralities of satellites has throughout its orbit a orbital height lower than a height necessary for geostationary orbits.

9. A constellation according to claim 1, wherein the orbits the first and second pluralities of satellites all have a mean motion that is one of 2, 3 and 4.

10. A constellation according to claim 1, wherein the predetermined portion of each satellite's orbit during which the satellite is active, is symmetrically disposed in mean anomaly about the apogee point of the orbit.

11. A constellation according to claim 1, wherein the orbits of each of the pluralities of satellites are further configured such that the portion of the orbits during which the satellites are active, is separated in angle from geostationary satellites orbiting in the equatorial plane of the earth by at least a predetermined amount.

12. A constellation according to claim 1, wherein each of the plurality of satellites has a power system configured to generate a first amount of power when the satellite is active and a second amount of power more than the first amount of power when the satellite is not active, to store excess power generated when the satellite is not active, and to activate the satellite with both the stored excess power and the generated first amount of power.

13. A constellation according to claim 1, further comprising:
   a third plurality of satellites in orbits around the earth, each of the third plurality of satellites configured to be active only during a same portion of the satellite's orbit as the predetermined portion of the orbit of each of the first plurality of satellites, the orbits of the third plurality of satellites being configured to form a third common ground track with third active arcs, the third common ground track having a same shape as, and displaced in longitude by a predetermined amount from, the first common ground track; and
   a fourth plurality of satellites in orbits around the earth, each of the fourth plurality of satellites configured to be active only during a same portion of the satellite's orbit as the predetermined portion of the orbit of each of the second plurality of satellites, the orbits of the third plurality of satellites being configured to form a fourth common ground track with fourth active arcs, the fourth common ground track having a same shape as, and displaced in longitude by the predetermined amount from, the second common ground track;
   wherein the predetermined amount of longitudinal displacement is such that at all times
   (i) each of the satellites in any of the third active arcs is separated by at least a predetermined angle, as observed from the earth, from any satellite in any of the second active arcs, and
   (ii) each of the satellites in any of the forth active arcs is separated by at least a predetermined angle, as observed from the earth, from any satellite in any of the first active arcs.

14. A satellite communications system, comprising:
   a plurality of satellites in orbits around the earth having apogees and perigees, each of the satellites having communications equipment thereon configured to communicate only during a predetermined portion of the satellite's orbit proximate to apogee, the orbits of the first plurality of satellites having a first argument of perigee and being configured to form a first common ground track, the first common ground track repeating daily and having a number of first active arcs each corresponding to the predetermined portion of each satellite's orbit during which the communications equipment on the satellite is configured to communicate, the orbits of the first plurality of satellites being further configured such that each one of the first active arcs begins and ends at points on a same meridian of longitude;
   a second plurality of satellites in orbits around the earth having apogees and perigees, each of the second plurality of satellites having communication equipment thereon configured to be communicate only during a predetermined portion of the satellite's orbit proximate to apogee, the orbits of the second plurality of satellites having a second argument of perigee being a supplementary angle to the first argument of perigee, and being configured to form a second common ground track, the second common ground track repeating daily and having a number of active arcs corresponding to the predetermined portion of each satellite's orbit during which the communications equipment on the satellite is configured to communicate, the orbits of the second plurality of satellites being further configured such that each of the second active arcs begins at a point coincident with the ending point of one of the first active arcs, and ends at a point coincident with the beginning point of the same one of the first active arcs; and a plurality of ground stations, each having communications equipment configured to communicate with the communications equipment on each of the first and second pluralities of satellites, and each located at a position on the earth from which it can track satellites in one of the first active arcs and satellites in the one of the second active arcs have coincident beginning and ending points.

15. A system according to claim 14, wherein the orbits of the first plurality of satellites and the second plurality are further configured such that at all times there is at least one satellite in at least one of
(i) each of the first active arcs and
(ii) each of the second active arcs.

16. A system according to claim 15, wherein the first plurality of satellites has a first number of satellites and the second plurality of satellites has a second number of satellites equal to the first number of satellites, and the orbits of the first plurality of satellites and the second plurality of satellites are further configured such that at any time one of the first plurality of satellites is at a beginning point of one the first active arcs, one of the second plurality of satellites is simultaneously at or near a coincidental ending point of one of the second active arcs.

17. A system according to claim 16, wherein the orbits of the first plurality of satellites and the second plurality are further configured such that satellites do not collide at points where the first and second ground tracks cross.

18. A system according to claim 16, wherein the satellites in each of the first ground track and the second ground track are equally spaced in mean anomaly.

19. A system according to claim 16, wherein the first plurality of satellites and the second plurality of satellites are further configured such that at all times each of the satellites in any one of the first active arcs and the second active arcs is separated by at least a predetermined angle, as viewed from any one of the ground stations, from each other satellite in the same active arc.

20. A system according to claim 14, wherein the orbit of each satellite of each of the pluralities of satellites is inclined at critical inclination.

21. A system according to claim 14, wherein each satellite of each of the pluralities of satellites has throughout its orbit a orbital height lower than a height necessary for geostationary orbits.

22. A system according to claim 14, wherein the orbits of the first and second pluralities of satellites all have a mean motion that is one of 2, 3 and 4.

23. A system according to claim 14, wherein the predetermined portion of each satellite's orbit during which the communications equipment on the satellite is configured to communicate, is symmetrically disposed in mean anomaly about the apogee point of the orbit.

24. A system according to claim 14, wherein the orbits of each of the pluralities of satellites are further configured such that the portion of the orbits during which the satellites are active, is separated in angle from geostationary satellites orbiting in the equatorial plane of the earth by at least a predetermined amount.

25. A system according to claim 14, wherein each of the plurality of satellites has a power system configured to generate a first amount of power when the communications equipment on the satellite is configured to communicate and a second amount of power more than the first amount of power when the communications equipment on the satellite is not configured to communicate, to store excess power generated when the communications equipment is not configured to communicate, and to configure the communications equipment to communicate with both the stored excess power and the generated first amount of power.

26. A system according to claim 14, wherein the communications equipment on each of the first and second pluralities of satellites is further configured to enable each of the plurality of the ground stations to communicate with one or more of the other ground stations.

27. A system according to claim 14, wherein the communications equipment on each of the first and second pluralities of satellites is further configured to communicate at frequencies allocated to geostationary satellites.

28. A method for satellite communications, comprising:

orbiting a first and a second plurality of communications satellites about the earth, the orbits having apogees and perigees; and enabling each satellite of the first and second pluralities of communications satellites to communicate only during a predetermined portion of its orbit proximate to apogee;

wherein the orbits of the first plurality satellites have a first argument of perigee and form a first common ground track on the earth, the first common ground track repeating daily and having a number of first active arcs, each first active arc corresponding to the portion of the orbit of each satellite during which the communications equipment on the satellite is enabled to communicate;

wherein the orbits of the second plurality satellites have a second argument of perigee being a supplementary angle to the first argument of perigee, and form a second common ground track on the earth, the second common ground track repeating daily and having a number of second active arcs, each second active arc corresponding to the portion of the orbit of each satellite during which the communications equipment on the satellite is enabled to communicate;

wherein the first plurality of satellites are orbited such that each on of the first active arcs begins and ends at points on a same meridian of longitude; and wherein the second plurality of satellites are orbited such that each of the second active arcs begins at a point coincident with the ending point of one of the first active arcs, and ends at a point coincident with the beginning point of the same one of the first active arcs.

29. A method according to claim 28, wherein the the first plurality of satellites and the second plurality of satellites are further orbited such that at all times there is at least one satellite in at least one of
(i) each of the first active arcs and
(ii) each of the second active arcs.

30. A method according to claim 29, wherein:

the first plurality of satellites has a first number of satellites and the second plurality of satellites has a second number of satellites equal to the first number of satellites; and the first plurality of satellites and the second plurality of satellites are further orbited such that at any time one of the first plurality of satellites is at a beginning point of one the first active arcs, one of the second plurality of satellites is simultaneously at or near a coincidental ending point of one of the second active arcs.

31. A method according to claim 30, wherein the first plurality of satellites and the second plurality are further orbited such that satellites do not collide at points where the first and second ground tracks cross.

32. A method according to claim 30, wherein the satellites in each of the first ground track and the second ground track are equally spaced in mean anomaly.

33. A method according to claim 30, wherein the first plurality of satellites and the second plurality are further orbited such that at all times each of the satellites in any one of the first active arcs and the second active arcs is separated by at least a predetermined angle, as viewed from the earth, from each other satellite in the same active arc.

34. A method according to claim 28, wherein the orbit of each satellite of the first and second pluralities of satellites is inclined at critical inclination.

35. A method according to claim 28, wherein each satellite of each of the pluralities of satellites has throughout its orbit an orbital height lower than a height necessary for geostationary orbits.

36. A method according to claim 28, wherein the orbits of the first and second pluralities of satellites all have a mean motion that is one of 2, 3 and 4.

37. A method according to claim 28, wherein the predetermined portion of each satellite's orbit during which the communications equipment on the satellite is enabled to communicate, is symmetrically disposed in mean anomaly about the apogee point of the orbit.

38. A method according to claim 28, further comprising:
communicating with the first and second pluralities of satellites at frequencies allocated to geostationary satellites.

39. A method according to claim 28, wherein each of the first and second pluralities of satellites has a power system generating a first amount of power when the communications equipment on the satellite is enabled and a second amount of power more than the first amount of power when the communications equipment is not enabled, and further comprising:
storing excess power generated when the communications equipment is not enabled; and
enabling the communications equipment with both the stored excess power and the generated first amount of power.

* * * * *